United States Patent [19]
Suzuki et al.

[11] Patent Number: 5,430,754
[45] Date of Patent: Jul. 4, 1995

[54] SOLID STATE LASER APPARATUS

[75] Inventors: Kenji Suzuki; Akira Eda; Katsuhiko Shimomura, all of Sodegaura, Japan

[73] Assignee: Mitsui Petrochemical Industries, Ltd., Tokyo, Japan

[21] Appl. No.: 144,512

[22] Filed: Nov. 2, 1993

[30] Foreign Application Priority Data

Nov. 6, 1992 [JP] Japan .................. 4-297451
Sep. 24, 1993 [JP] Japan .................. 5-238397

[51] Int. Cl.$^6$ ........................................ H01S 3/05
[52] U.S. Cl. ........................ 372/92; 372/105; 372/19; 372/22
[58] Field of Search ............ 372/105, 106, 19, 22, 372/23, 27, 92

[56] References Cited

U.S. PATENT DOCUMENTS

| | | |
|---|---|---|
| 4,277,138 | 7/1981 | Dammann . |
| 4,748,614 | 5/1988 | Dammann et al. . |
| 4,798,448 | 1/1989 | van Raalte . |
| 4,895,790 | 1/1990 | Swanson et al. . |
| 5,091,912 | 2/1992 | Bretenaker et al. ............ 372/23 |
| 5,130,997 | 12/1992 | Ortiz et al. . |
| 5,161,042 | 12/1992 | Hamada . |
| 5,182,759 | 1/1993 | Anthon et al. . |

FOREIGN PATENT DOCUMENTS

| | | |
|---|---|---|
| 508406A2 | 10/1994 | European Pat. Off. . |
| 2150084 | 6/1990 | Japan . |
| 388380 | 4/1991 | Japan . |
| 3174786 | 7/1991 | Japan . |
| 5173003 | 5/1993 | Japan . |

OTHER PUBLICATIONS

"Single-Longitudinal-Mode Operation and Second Harmonic Generation of Nd:YV04 Microchip Lasers" vol. 16, No. 1, Nov. 1991, New York US pp. 1665–1667.
"Single-Axial Mode, Intracavity Doubled Nd:YAG Laser" IEEE Journal of Quantum Electronics vol. 27, No. 9, Sep. 1991, New York US.
Michael Farn et al., Conference on Binary Optics, "Color Separation Gratings", NASA Conference Publication 3227, 409–421, 1993. (No month available).
Michael Farn et al., Conference on Binary Optics, "Theory of Dispersive Microlenses", NASA Conference Publication 3227, 395–408, 1993. (No month available).
Michael Farn et al., "Color Separation by Use of Binary Optics", Optics Letters, vol. 18, No. 15, Aug. 1, 1993.
"J. Q. Yao and Theodore S. Fahlen, J. Appl. Phys. vol. 55(1), 65(1984)" Jan.
A. Yariv: Quantum Electronics, 2nd ed., p. 112, Wiley 1967 (No month available).
Laser Research 17(12)41 (1989) (No month available).

*Primary Examiner*—Rodney B. Bovernick
*Assistant Examiner*—Robert McNutt

[57] ABSTRACT

A solid state laser apparatus is capable of suppressing a mode hopping phenomena by restricting longitudinal modes except a fundamental mode, thereby providing a very stable output. The solid state laser apparatus includes such components as a semiconductor laser emitting a pumping radiation for exciting a lasant material, a lens systems for focusing the pumping radiation and an optical resonator including a concave mirror. The lasant material may be formed of Nd:YVO$_4$ doped with approximately 1 at % of Nd and a non-linear optical element may be formed of KTiOPO$_4$ with an inclined c-axis.

32 Claims, 14 Drawing Sheets

SOLID STATE LASER APPARATUS

BACKGROUND OF THE INVENTION

1. Field of the Invention

The present invention relates to a solid state laser apparatus for use as a light source in such fields as optical recording, communication and measurement.

2. Description of Related Art

FIG. 23(a) is a front view showing a structure of conventional solid state laser apparatus. The solid state laser apparatus includes a light source emitting a pumping radiation 66 for exciting a lasant material 62, a lens system 61 for focusing of the pumping radiation 66 and an optical resonator 65 including the lasant material 62, a non-linear optical element 63 and a concave mirror 64, which are disposed on an optical axis 68. Here, such example is described that the lasant material 62 is formed of Nd:YVO$_4$ doped with about 1% of Nd, which is a positive uniaxial crystal. The non-linear optical element 63 is formed of KTiOPO$_4$ which is a positive biaxial crystal. Finally, a semiconductor laser of 809 nm in oscillatory wavelength is employed as the light source 60.

When the pumping radiation 66 from the light source 60 is focused by the lens system 61, and enters the lasant material 62, an inverted distribution is formed in the lasant material 62. Thus, in the case of Nd:YVO$_4$ crystal, a light amplification of 1064 nm in wavelength is allowed. A surface 62a of lasant material 62 is coated with a coating which has a high transmissivity at a wavelength of 809 nm that corresponds to the pumping radiation 66 and a high reflectance at a wavelength of 1064 nm. A surface 64a of the concave mirror 64 is coated with a coating which has a high transmissivity at a wavelength of 532 nm and a high reflectance at a wavelength of 1064 nm. Thus, an optical resonator at a wavelength of 1064 nm is formed of the two surfaces 62a and 64a.

As a laser beam of 1064 nm in wavelength oscillated by a light amplifying effect of the laser material 62 passes through the non-linear optical element 63, it is converted to 532 nm in wavelength, which corresponds to a second harmonic, and an output beam 67 is obtained. Here, surfaces 63a and 63b of the non-linear optical element 63 are coated with coatings which have a high transmissivity at wavelengths of 1064 and 532 nm. A surface 62b of the lasant material 62 is coated with a coating which has a high transmissivity at a wavelength of 1064 nm.

FIG. 23 (b) is a partial perspective view showing an arrangement of polarization axes of the lasant material 62 and the non-linear optical element 63 shown in FIG. 23(a). Nd:YVO$_4$ forming the lasant material 62 is a positive uniaxial crystal. A principal index of refraction nc is higher than two other principal indices of refraction na. Further, c-axis that is an oscillation facilitating axis is directed vertically upwardly to the optical axis 68. Finally, an a-axis of the principal indices of refraction na is positioned so as to coincide with the optical axis 68.

On the other hand, KTiOPO$_4$ forming the non-linear optical element 63 is a positive biaxial crystal, and is cut, when x-, y- and z-axes are selected so that principal indices of refraction of an index ellipsoid are nx < ny < nz, in parallel with a z-y' plane that is inclined at angles $\theta = 90°$ between the z- and y'-axes and $\phi = 21.3°$ between the y- and y'-axes (J. Q. Yao and Theodore S. Fahlen, J. Appl. Phys. vol. 55(1), 65 (1984)). Therefore, the z- and y'-axes come to be polarization axes, x'-axis coincides with the optical axis 68, and the y'-axis is arranged so as to be inclined at an angle $\alpha = 45°$ to the c-axis of lasant material 62, as viewed from the direction of optical axis 68. In addition, because the non-linear optical element 63 is controlled by temperature adjustment or the like, so that a phase difference by one-way retardation at a specified wavelength of longitudinal mode comes to be m$\pi$ (where m is an integer), polarization in the lasant material 62 is maintained in a linear polarization parallel with the c-axis, the oscillation facilitating axis.

In such a solid state laser apparatus, the output beam 67 is emitted to the outside as a coherent light of 532 nm in wavelength through the concave mirror 64, because a laser beam of 1064 nm in wavelength enclosed within the optical resonator is harmonically converted in the non-linear optical element 63 in so-called type II phase matching condition, where a second harmonic is produced by existence of fundamental waves linearly polarized in the z- and y'-axes.

As another example, a laser with Nd$_x$Y$_{1-x}$Al$_3$(BO$_3$)$_4$ employed as a lasant material is disclosed in Japanese Laid-Open Patents (KOKAI) No. 91-174786 and 91-88380, wherein a beam walk-off is caused in the lasant material, and a laser oscillation is initiated along the oscillation facilitating axis.

In a conventional solid state laser apparatus, however, as adjacent longitudinal modes in the optical resonator 65 are less distinctive by a gain difference between them, and even in the case that a laser oscillation is caused in a longitudinal mode with a maximum gain, another laser oscillation is also allowed in an adjacent longitudinal mode with a non-maximum gain due to a harmonic conversion loss. It is a problem that a so-called mode-hop phenomenon, that is an oscillation mode to be changed in time course between longitudinal modes for possible oscillation, is caused, and the output beam 67 varies in intensity. Such mode-hop phenomenon is caused also in a general optical resonator including two or more double refraction optical elements.

In order to prevent such mode-hop phenomenon, it is required to match a frequency of the longitudinal mode determined by a length of the optical resonator with a gain peak frequency of the lasant material 62 by finely adjusting a positioning angle of the non-linear optical element 63, concave mirror 64 and the like in a order of 0.1°. For example, as such adjusting operation is very difficult, it is another problem that a production yield is reduced. Those with an oscillation facilitating axis in lasant material have been described above. On the contrary, in the case that a lasant material is isotropic, because a gain does not depend on polarization, longitudinal mode is not completely discriminated. Therefore, although such polarizing element as Brewster a plate may be separately inserted in an optical resonator, it is a problem that an apparatus is thereby increased in size.

SUMMARY OF THE INVENTION

Hence, in order to solve the problems, it is an object of the invention to present a solid state laser apparatus capable of suppressing the mode-hop phenomenon, allowing oscillation in a single longitudinal mode, and providing a very stable output beam by increasing a resonance loss in longitudinal modes except a fundamental mode.

The invention presents a solid state laser apparatus with plural optical elements disposed in an optical resonator, wherein one of the optical elements is a lasant material excited by a pumping radiation. Further, at least two of the optical elements are birefringent optical elements. Finally, an optical axis of the optical resonator is formed by one of two polarizing optical axes separated by a beam walk-off that is caused in a first one of the birefringent optical elements.

It is preferable in the invention that the optical resonator is of a linear type, at least one of reflecting mirror means composing the optical resonator is curved mirror means. It is further preferable that the first birefringent optical element is placed between the curved mirror means and a second one of the birefringent optical element other than the first birefringent optical element. Here, the reflecting mirror means is a coating layer with a high reflectance at a specified wavelength coated on a surface of the optical element or a mirror independently positioned.

Additionally, it is preferable in the invention that the optical resonator is of a linear type, at least one of reflecting mirror means composing the optical resonator is flat mirror means, and a second birefringent optical element other than the first birefringent optical element is placed between the flat mirror means and the first birefringent optical element.

Moreover, it is preferable in the invention that the lasant material is the first birefringent optical element.

Furthermore, it is preferable in the invention that curved reflecting mirror means composing the optical resonator, the lasant material providing the first birefringent optical element, at least one of the second birefringent optical elements and reflecting mirror means composing the optical resonator are placed in the order from an incident side of the pumping radiation, and a beam walk-off is caused in the lasant material.

It is also preferable in the invention that the lasant material is formed of Nd:YVO$_4$.

Further, it is preferable in the invention that at least one of the second birefringent optical elements is formed of a non-linear optical material and a laser beam oscillated by the lasant material is converted to a second harmonic by the non-linear optical material.

It is still preferable in the invention that the nonlinear optical material is formed of KTiOPO$_4$.

It is still further preferable in the invention that curved mirror means composing the optical resonator, the lasant material, the first birefringent optical element, the second birefringent optical element and flat mirror means composing the optical resonator are placed in the order from an incident side of the pumping radiation, and a beam walk-off is caused also in the second birefringent optical element.

Additionally, it is preferable in the invention that the lasant material is the second birefringent optical element.

It is further preferable in the invention that reflecting mirror means composing the optical resonator, the lasant material providing the second birefringent optical element, the first birefringent optical element and curved mirror means composing the optical resonator are placed in the order from an incident side of the pumping radiation.

It is also preferable in the invention that the first birefringent optical element is formed of a non-linear optical material, and a laser beam oscillated by the lasant material is converted to a second harmonic by the non-linear optical material.

Moreover, it is preferable in the invention that reflecting mirror means composing the optical resonator, the lasant material, the second birefringent optical element, the first birefringent optical element and curved mirror means composing the optical resonator are placed in the order from an incident side of the pumping radiation.

It is further preferable in the invention that the lasant material is formed of Nd:YAG.

In addition, it is preferable in the invention that the first birefringent optical element is formed of a non-linear optical material, and a laser beam oscillated by the lasant material is converted to a second harmonic by the non-linear optical material.

It is moreover preferable in the invention that the non-linear optical material is formed of KNbO$_3$.

According to the invention, a beam walk-off with wave number vector and Poynting's vector of light mutually different in direction from each other is caused in a birefringent optical element, as an optical resonator is formed for one of two polarizing optical axes separated by the beam walk-off, a resonance loss with respect to the other polarizing optical axis is increased. Further, discrimination by polarizing mode is enabled, and an output variation due to a longitudinal mode hopping is suppressed.

In FIG. 1($a$) showing a principle of the invention. An optical resonator 6 comprises a first birefringent optical element 1, second birefringent optical element 2, lasant material 3 without birefringent property and reflecting mirrors 4 and 5. By making use of an optical anisotropy of the first birefringent optical element 1, a beam walk-off is generated in a beam passing therethrough. Thereby, an optical axis of the optical resonator 6 is formed by only one optical axis 7 of two polarizing optical axes 7 and 8 separated by the beam walk-off.

For example, when the first birefringent optical element 1 is a uniaxial crystal, a beam walk-off angle $\rho$ can be expressed by the following formula, using an angle $\xi$ between the optical axis and c-axis, a principal index of refraction ne of the c-axis and a principal index of refraction no of a-axis:

$$\rho = \operatorname{Arctan} \frac{\left\{ \left(\frac{no}{ne}\right)^2 - 1 \right\} \tan \xi}{1 + \left(\frac{no}{ne}\right)^2 \cdot \tan^2 \xi}$$

Here, in a surface 1a on the side of lasant material 3 of the first birefringent optical element 1, when X-axis perpendicular to the optical axis 7 (in the forward direction of the sheet of FIG. 1($a$)) and Y-axis (in the upward direction of the sheet of FIG. 1($a$)) are established, as shown in FIG. 1($b$), the direction of polarizing axis of the first birefringent optical element 1 for a beam on the optical axis 7 is designed to be parallel with the Y-axis. In addition, polarizing axes of the first and second birefringent optical elements 1 and 2 are within a plane perpendicular to the optical axis 7, and form an angle 45° between them. Therefore, the direction of polarization of a beam related to laser oscillation, originated in the surface 1a on the side of lasant material 3 of the first birefringent optical element 1, passing through the first birefringent optical element 1, and transmitted to a surface 1b is parallel with the Y-axis. With regard to polarization in longitudinal modes of the optical resonator, when the beam is succeedingly passed through the second birefringent optical element 2, reflected by the reflecting mirror 5, and returned to the surface 1b again, a linear polarization p3 parallel with the Y-axis is obtained in a longitudinal mode in which a phase difference $\delta$ by retardation of the second birefringent optical element 2 is $m\pi$ (where m is an integer), while polarizations p1, p2, p4 and p5 in longitudinal modes in which $\delta \neq m\pi$ are elliptic polarizations with a major axis of the ellipsoid coinciding with the X-axis or Y-axis. When the beam is succeedingly transmitted and passes through the first birefringent optical element 1, because no optical axis of the optical resonator is formed for an optical axis 8 due to the beam walk-off in the first birefringent optical element 1, a resonance loss in the longitudinal modes with a polarizing component in the X-axis is increased, and oscillation in the longitudinal modes except a polarizing mode of the direction p3 parallel with the Y-axis as shown in FIG. 1(b) is thereby restricted.

The resonance loss Loss is expressed by the following equations, using the phase difference $\delta$ due to one-way retardation of the birefringent optical element 2:

$$\text{Loss} = \sin^2 \delta \quad (1)$$

$$\delta = 2\pi \cdot \Delta n \cdot L / \lambda \quad (2)$$

where $\Delta n$ is a difference of indices of refraction between two polarizing axes of the second birefringent optical element 2, L is a length of material of the second birefringent optical element 2, and $\lambda$ is a wavelength of longitudinal mode.

Therefore, the longitudinal mode corresponding to the polarizing mode of the direction p3 parallel with the Y-axis of the first birefringent optical element is dominantly provided for oscillation, mode hopping to the other longitudinal modes is suppressed, and an output variation is reduced.

Thus, the resonance loss Loss for such a wavelength that the phase difference $\delta$ due to one-way retardation of the second birefringent optical element 2 is substantially $m\pi$ (where m is an integer) becomes almost zero. Thereby, oscillation in a single longitudinal mode is obtained in the case that a wavelength interval satisfying such condition is appropriate.

Now, a range corresponding to the expression "substantially $m\pi$" is described. When the phase difference $\delta$ due to one-way retardation is continuously changed, a condition of $\delta = m\pi$ is succeedingly established with respect to adjacent longitudinal modes, and the longitudinal modes are discriminated. In such a case, even in an intermediate range of $\delta$ where $\delta = m\pi$ is not exactly true, the discrimination of longitudinal modes is effective for either longitudinal mode. Further, it is expected that the maximum effective range is to $\frac{1}{2}$ of a phase difference due to one-way retardation to a wavelength of adjacent longitudinal mode spaced by an interval $FSR_{cav}$ between longitudinal modes of the optical resonator when a reference is set at $\delta_0 = m\pi$ for a phase difference $\delta_0$ due to one-way retardation of wavelength $\lambda_0$ in a longitudinal mode of an optical resonator. The value $\delta(\pm\frac{1}{2})$ is expressed by the following formula:

$$\delta(\pm \tfrac{1}{2}) = \delta_0 \pm \{(\tfrac{1}{2}) \times 2\pi \times FSR_{cav}/FSR_{pol}\}$$

where $FSR_{pol}$ is an interval of wavelength with a phase difference due to one-way retardation of the second birefringent optical element at $2\pi$, and is approximately obtained by the following equation:

$$FSR_{pol} = -\lambda^2/(\Delta n \times L)$$

where $\lambda$ is a wavelength, $\Delta n$ a difference between indices of refraction, and L a physical length. In the case of $KTiOPO_4$ cut in a length of 5 mm so that a second harmonic of 1.06 $\mu$m in wavelength is generated, for example, $$FSR_{pol} = -(1064)^2[\text{nm}]/(0.087 \times 5[\text{nm}]) = -26 \text{ Å(angstrom)}$$

This means that the phase difference due to one-way retardation of a wavelength of $1064.0 - 2.6 = 1061.4$ nm comes to be $(m+2)\pi$ (where m is an integer) when the phase difference due to one-way retardation for a wavelength of 1064 nm is $m\pi$, for example. In addition, in the case of an optical resonator with $FSR_{cav}$ at 0.5 Å, for example;

$$\delta(\pm 1/2) = \delta_0 \pm \{(1/2) \times 2\pi \times SR_{cav}/FSR_{pol}\}$$
$$= m\pi \pm (1/2) \times 2\pi \times 0.5/(-26)$$
$$= \{m \pm 1/(-52)\}\pi$$

Accordingly, when the phase difference $\delta$ due to one-way retardation of the second birefringent optical element for a wavelength $\lambda_0$ in a longitudinal mode of an optical resonator is:

$$\delta_{+\frac{1}{2}} < \delta < \delta_{-\frac{1}{2}}$$

the wavelength is distinguished, and laser oscillation is provided.

In this way, the second birefringent optical element 2 serves for separating polarizations corresponding to the longitudinal modes in the optical resonator, and the first birefringent optical element 1 serves for discriminating only one mode of the seperated polarizations by means of a beam walk-off. The second birefringent optical element 2 is not required to comprise a single element, and may be a combination of plural birefringent optical elements capable of serving for separating polarizing modes according to the longitudinal modes. In other words, although such case with two birefringent optical elements has been described, generally, even when three or more birefringent optical elements are increased, only one longitudinal mode can be discriminated by optical anisotropy and beam walk-off in the birefringent optical elements.

Moreover, since the optical resonator is of a linear type, at least one of reflecting mirror means composing the optical resonator is the curved mirror means, and the first birefringent optical element is placed between the curved mirror means and a second birefringent optical element other than the first birefringent optical element. A light deviating from an optical axis of the optical resonator is reflected outside the optical axis, and a resonance loss is surely caused for the other polarizing optical axis. In detail, as shown in FIG. 2, when a mirror 4 of the optical resonator is a flat mirror, as a light along two polarizing optical axes 7 and 8 separated by a beam walk-off that in the first birefringent optical element 1 is reflected as it is to the opposite direction, and the optical axes are matched, the optical resonator is formed for the two polarizing optical axes 7 and 8. Therefore, in order to increase a resonance loss with respect to the other polarizing optical axis 8, as shown in FIG. 1, a curved mirror is preferably provided as the mirror 4 with more spacing between the two polarizing optical axes 7 and 8 because of a beam walk-off for mode discrimination.

Additionally, since the optical resonator is of a linear type, at least one of reflecting mirror means composing the optical resonator is flat mirror means, and a second birefringent optical element other than the first birefringent optical element is placed between the flat mirror means and the first birefringent optical element, even when a beam walk-off without a purpose of mode discrimination is caused, the optical resonator is formed for two polarizing optical axes separated by the beam walk-off. In detail, as shown in FIG. 3, in the case that a beam walk-off for mode discrimination is generated in the first birefringent optical element 1, and a beam walk-off without a purpose of mode discrimination in the second birefringent optical element 2, because a light along one polarizing optical axis 9 of two polarizing optical axes 7 and 9 that are separated by the beam walk-off in the second birefringent optical element 2 is reflected outside the axis when a mirror 5 on the side of second birefringent optical element 2 is formed as a curved mirror, thus a resonance loss is generated with respect to the polarizing optical axis 9. This is very disadvantageous for laser oscillation in which polarization by two optical axes 7 and 9 is essential. Therefore, in the case a beam walk-off is caused also in the second birefringent optical element 2, as shown in FIG. 4, a resonance loss due to such beam walk-off without a purpose of mode discrimination can be prevented by providing a flat mirror for the mirror 5 in the resonator.

Further, by providing a condition of $L \times \tan\rho \geq \omega$ where $\omega$ is a radius of transverse mode in an electric field in a lasant material, $\rho$ a beam walk-off angle in a birefringent optical element, and L a length of material of the birefringent optical element, discrimination of two polarizing axes separated by the beam walk-off can be easily achieved. Here, the radius $\omega$ of transverse mode in an electric field is a distance where an amplitude of electric field of a Gaussian beam comes to be 1/e (where e is a base of natural logarithm) of a value at a central axis of the beam (A. Yariv: Quantum Electronics, 2nd ed., p.112, Wiley).

In detail, as shown in FIG. 5(a), since a beam walk-off is caused in the first birefringent optical element 1, the two polarizing optical axes 7 and 8 are separated, and light beams 7a and 8a with a Gaussian intensity distribution along the optical axes 7 and 8 are formed. On the other hand, a pumping radiation 10 for exciting the lasant material 3 enters along the optical axis 7, and a excited area having a spot with a radius equal to or less than a beam radius of the light beam 7a is formed in the lasant material 3. Thus, such arrangement of directing a pumping radiation so as to be coincident with the optical axis 7 of optical resonator 6 is generally referred to as coaxial excitation method. When the beam 8a to be separated by the beam walk-off and the spot area of pumping radiation 10 are overlapped by each other to some extent, although no optical axis of the optical resonator 6 is formed geometrically, a laser oscillation is yet caused for the light beam 8a because of a gain exceeding a loss. Then, by providing the following condition:

$$d1 = L \times \tan\rho \geq \omega \qquad (3)$$

where d1 is a spacing between the optical axes 7 and 8 at a position of exit from the first birefringent optical element, $\omega$ is a beam radius of the light beam 7a along the optical axis 7 inside the lasant material 3, $\rho$ is a beam walk-off angle in the first birefringent optical element 1, and L is a length of material of the first birefringent optical element 1, thus the laser oscillation of the light beam 8a along the optical axis 8 is suppressed, and the mode discrimination can be easily achieved. The concept is applicable also to so-called side excitation method, in which a pumping radiation 10 is allowed to enter from the direction perpendicular to an optical axis 7 of optical resonator 6 as shown in FIG. 5(b).

Moreover, since a reflecting mirror composing the optical resonator, first birefringent optical element and second birefringent optical element other than the first birefringent optical element are placed in succession, and the reflecting mirror is such that a spacing between two polarizing optical axes separated by a beam walk-off is more than a radius of an aperture of the reflecting mirror, the mode discrimination is highly facilitated. In detail, as shown in FIG. 6, for example, a first birefringent optical element 1 also serves as a lasant material 3, and laser oscillation of a light beam 8a is not effected, if the light beam 8a is not reflected by a mirror 4, even when the light beam 8a is separated by a beam walk-off. Therefore, by limiting an effective aperture radius of mirror 4 composing an optical resonator, the mode discrimination can be easily achieved. Thus, by providing the following relation:

$$d2 = L \times \tan\rho \geq r/N \qquad (4)$$

where d2 is a spacing between optical axes 7 and 8 on the mirror 4, r is an effective aperture radius of the mirror 4, $\rho$ is a beam walk-off angle in the first birefringent optical element 1, and L is a length of material of the first birefringent optical element 1, thus laser oscillation of the light beam 8a along the optical axis 8 is suppressed, and the mode discrimination is achieved. Here, N is desired to be set at 10, more preferably 5. Such a concept of limiting an aperture of resonator can be also achieved by such methods as (1) forming a mask 11 in an area outside an effective aperture of the mirror 4, as shown in FIG. 7; (2) inserting a diaphragm 12 between the first birefringent optical element 1 and mirror 4, as shown in FIG. 8; or (3) forming a small curved portion 1c in a surface of the first birefringent optical element 1 by utilizing such fine processing technology as photolithography to integrally provide a mirror composing an optical resonator (Japanese Patent Application No. 92-161407, published as JP-A-5-173003), as shown in FIG. 9. Furthermore, as shown in FIG. 10, diaphragms 12a and 12b may be inserted between the lasant material 3 in which a beam walk-off is generated and mirror 4, and the lasant material 3 and first birefringent optical element 1, respectively, for preventing laser oscillation along the optical axis 8. Such arrangement is particularly effective when an optical axis for excitation cannot be selected, for example, in the case of lamp excitation. The effective aperture radius means a radius of a circular surface area in the reflecting mirror that is capable of smoothly reflecting a laser beam without causing any distortion in a wave front.

Furthermore, since a laser material serves as a first birefringent optical element, a laser oscillation is dominantly effected on one optical axis of two polarizing optical axes generated in the first birefringent optical element. Specifically in an optical resonator 5 with a first birefringent optical element 1 placed between a mirror 4, which is a curved mirror, and a second birefringent optical element 2 except the first birefringent optical element and the second birefringent optical element 2 other than the first birefringent optical element 1 between a mirror 5, which is a flat mirror, and the first birefringent optical element 1, as shown in FIG. 11, a polarizing optical axis cannot be selected only by such physical arrangement, an ordinary and extraordinary rays generated in the first birefringent optical element out of lights directed toward the mirror 5 are separated on a surface 1a, and one of them is advanced along a polarizing optical axis 7, and the other along a polarizing optical axis 13. Oscillation at such wavelength that a phase difference δ due to retardation in a second birefringent optical element 2 is, for example, mπ and nπ (where m and n are integers close to each other) is possibly present in the two polarizing axes simultaneously.

Then, in the case that both ordinary and extraordinary rays satisfy the condition regarding phase difference, in order to discriminate the two polarizing optical axes, and allow a laser oscillation only on one of the axes, a gain difference of laser material should be present between the polarizing optical axes. Therefore, by using a crystal having a birefringent property as the lasant material, a gain difference in laser oscillation is caused between the polarizing optical axes, one of them is dominantly oscillated, and a single longitudinal mode oscillation can be obtained.

Although such case has been illustratively described that an optical axis of optical resonator is matched with an optical axis of ordinary ray in a first birefringent optical element, discrimination of longitudinal modes can be also achieved in a similar manner by matching the optical axis of optical resonator with an optical axis of extraordinary ray in the first birefringent optical element.

In addition, because a light source emitting a pumping radiation is a semiconductor laser, an entire solid state laser apparatus can be reduced in size and weight.

As described above, according to the invention, the mode hopping phenomenon to other longitudinal mode is suppressed, since longitudinal modes are discriminated by means of not only an oscillation facilitating axis of lasant material but also separation of two polarizing optical axes by beam walk-off, so that a very stable output with less variation can be obtained.

These and other objects of the present application will become more readily apparent from the detailed description given hereinafter. However, it should be understood that the preferred embodiments of the invention are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF PREFERRED EMBODIMENTS

(First Embodiment)

Figure 1A:
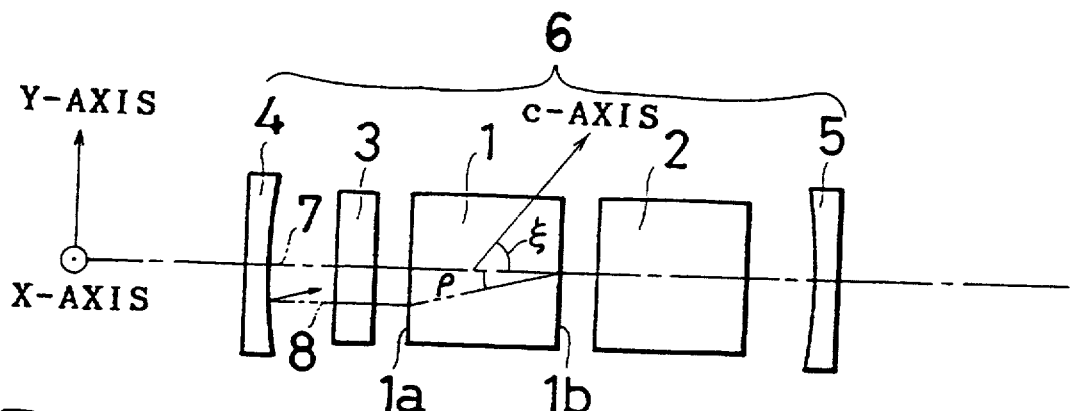
FIG. 1(a) shows a principle of the invention, and FIG. 1(b) a polarizing mode of longitudinal mode in an optical resonator.
Figure 1B:
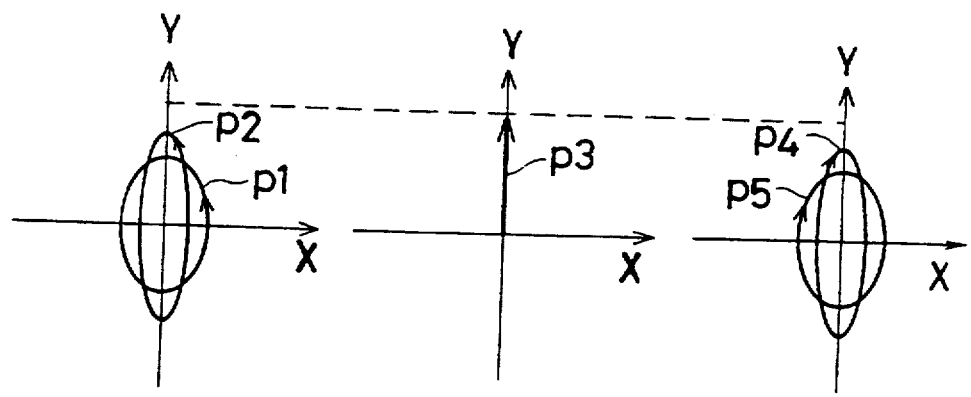
Figure 2:
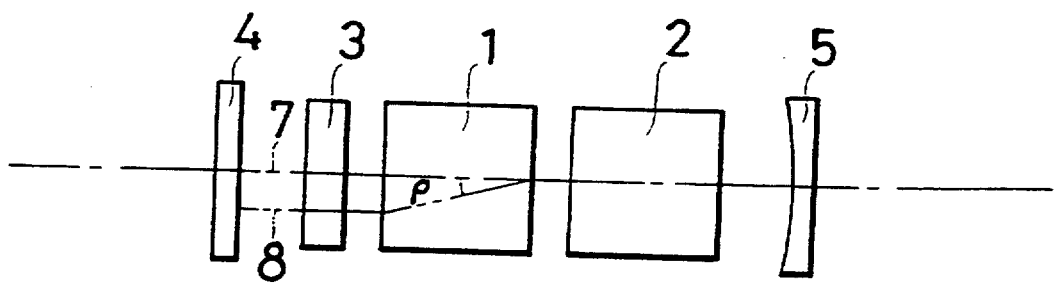
FIG. 2 is a block diagram showing a part of a solid state laser apparatus with a flat mirror employed for mirror 4, and a curved mirror for mirror 5.
Figure 3:
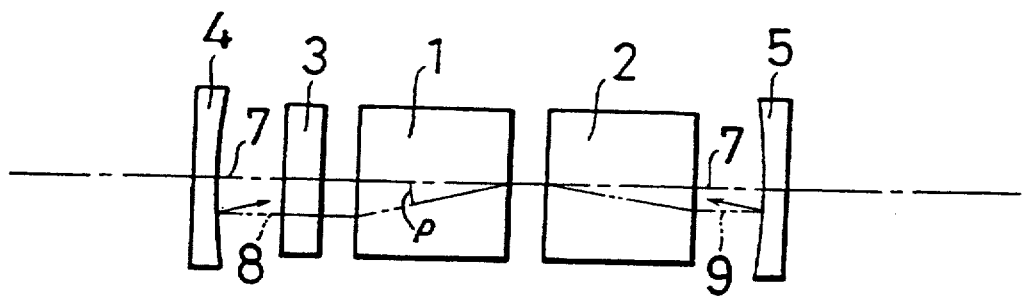
FIG. 3 is a block diagram showing a part of a solid state laser apparatus with curved mirrors employed for mirrors 4 and 5.
Figure 4:
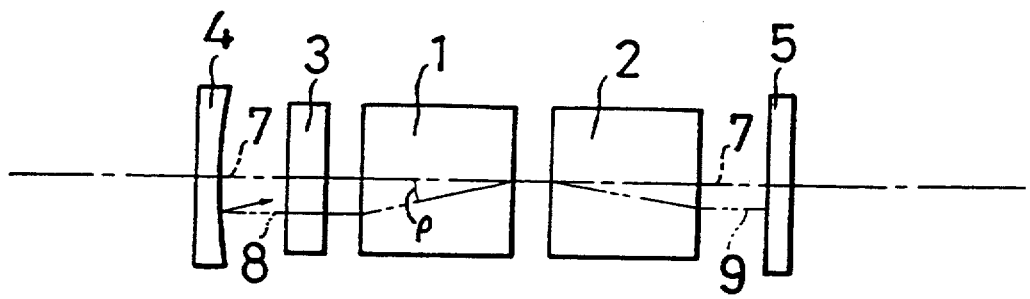
FIG. 4 is a block diagram showing a part of a solid state laser apparatus with a curved mirror employed for mirror 4, and a flat mirror for mirror 5.
Figure 5:
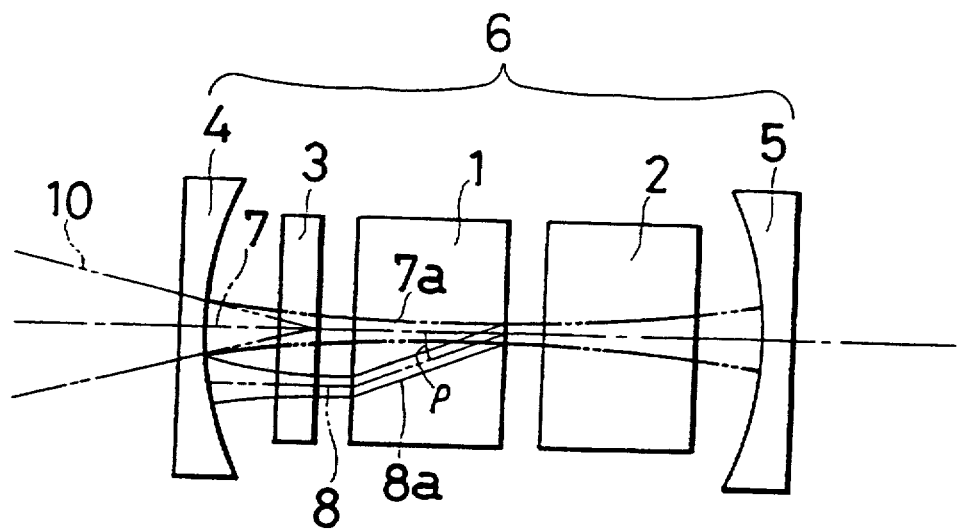
FIG. 5(a) is a partial block diagram showing a beam in FIG. 1(a), and FIG. 5(b) a partial perspective view illustrating an example of lasant material 3 in side excitation.
Figure 5:
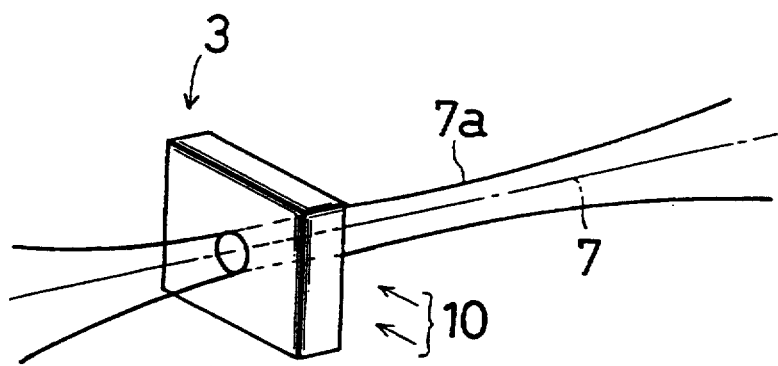
Figure 6:
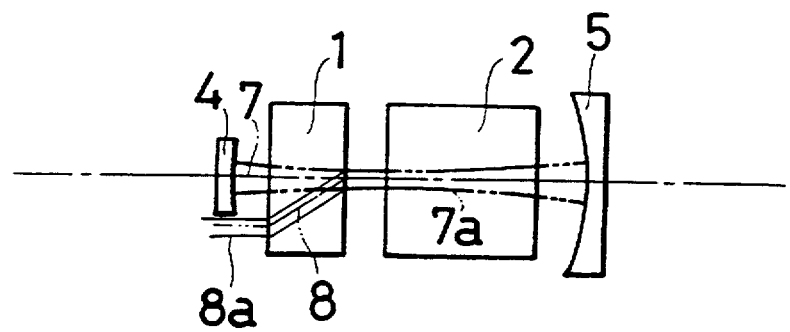
FIG. 6 is a block diagram of a part of a solid state laser apparatus, illustrating an example of separation of a light beam.
Figure 7:
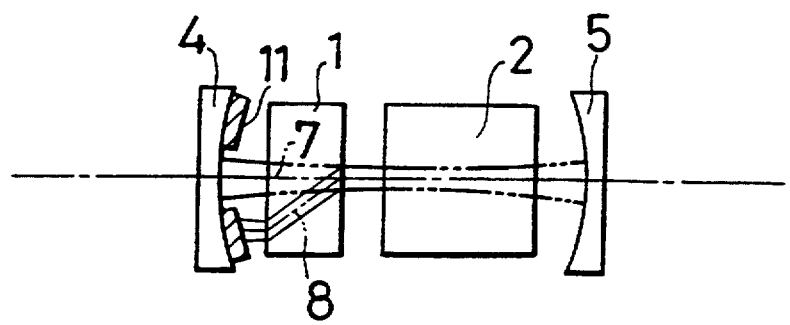
FIG. 7 is a block diagram of a part of a solid state laser apparatus, illustrating another example of separation of a light beam.
Figure 8:
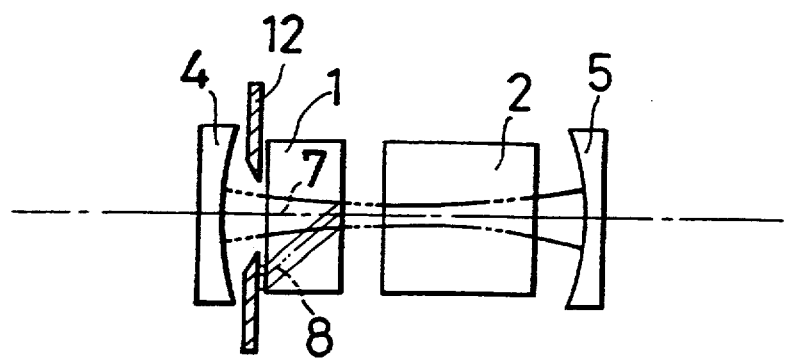
FIG. 8 is a block diagram of a part of a solid state laser apparatus, illustrating other example of separation of a light beam.
Figure 9:
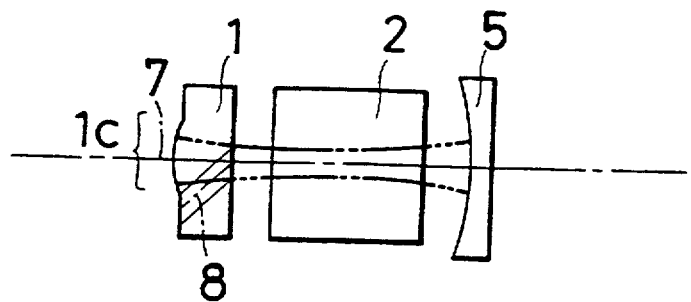
FIG. 9 is a block diagram of a part of a solid state laser apparatus, illustrating still other example of separation of a light beam.
Figure 10:
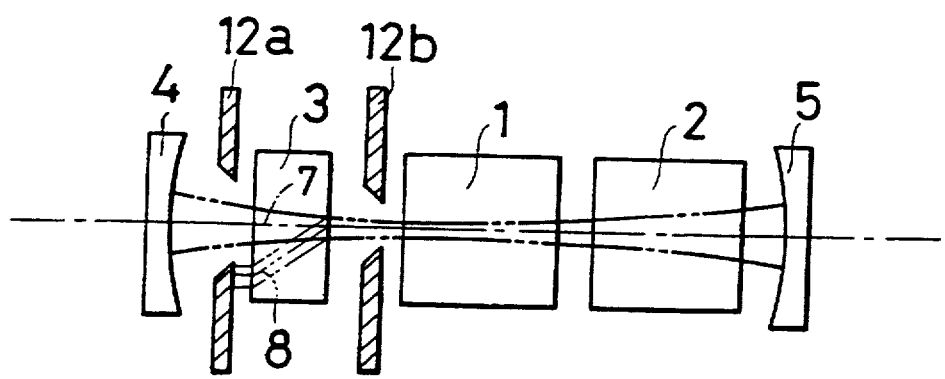
FIG. 10 is a block diagram of a part of a solid state laser apparatus, illustrating further example of separation of a light beam.
Figure 11:
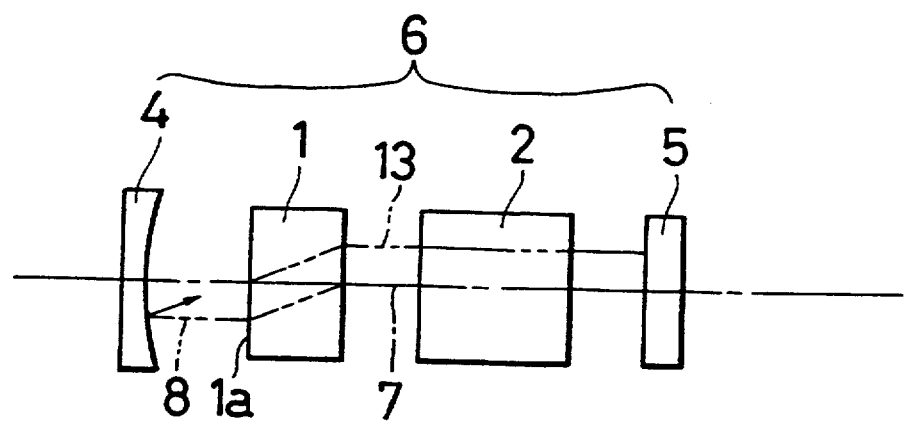
FIG. 11 is a partial block diagram showing discrimination of polarization modes by utilizing a birefringent property of a lasant material.
Figure 12A:
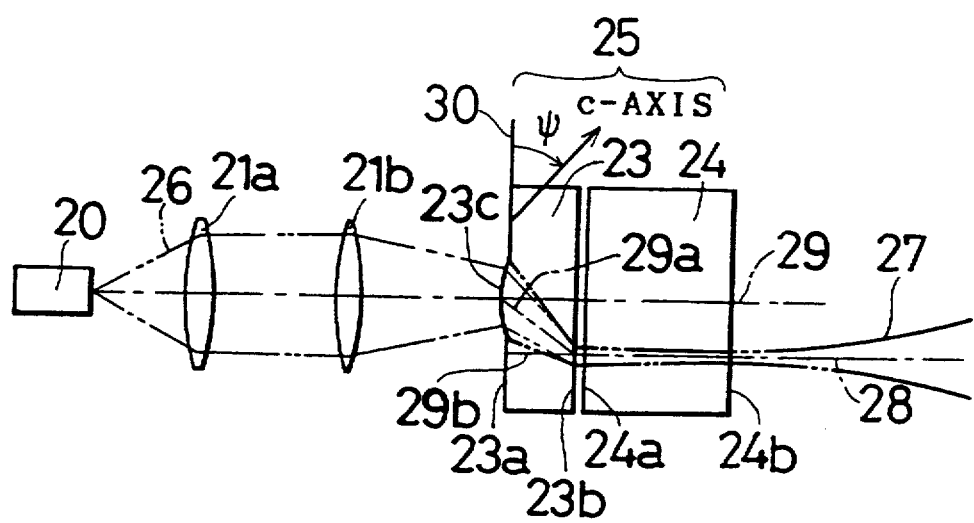
FIG. 12(a) is a front view showing a structure of a solid state laser apparatus of a first embodiment according to the invention, and FIG. 12(b) a graph showing a polarizing mode in a surface 24a of a non-linear optical element 24.

FIG. 12(a) is a front view showing a structure of a solid state laser apparatus of a first embodiment according to the invention. The solid state laser apparatus comprises such components as a semiconductor laser (SLD 303 WT-25 supplied by SONY) 20 emitting a pumping radiation 26 for excitating of a lasant material 23, lens systems 21a and 21b (F-L20 supplied by New Port) for focusing the pumping radiation 26 and an optical resonator 25 comprising the lasant material 23 formed of Nd:YVO$_4$ doped with approximately 1% of Nd and a non-linear optical element 24 formed of KTiOPO$_4$, wherein a surface 23b of the lasant material 23 is in contact with a surface 24a of the nonlinear optical element 24. In a center of the surface 23a of lasant material 23, a small spherical portion 23c is formed by means of a fine processing technology utilizing the photolithography, and an aperture thereof is 75 μm in radius and 12 mm in radius of curvature.

The small curved portion 23c of the lasant material 23 is coated with a coating having a reflectance of 99.9% or more at a wavelength of 1064 nm that is an oscillating wavelength of the lasant material 23 and a transmissivity of 95% or more at a wavelength 809 nm of the pumping radiation 26. A surface 23b on the side of non-linear optical element 24 of the lasant material 23 is coated with a coating having a transmissivity of 99.9% or more at a wavelength of 1064 nm. A surface 24a on the side of lasant material 23 of the non-linear optical element 24 is coated with a coating having a transmissivity of 99.9% or more at a wavelength of 1064 nm, and a surface 24b opposite is coated with a coating having a reflectance of 99.9% or more at a wavelength of 1064 nm and a transmissivity of 95% or more at a wavelength of 532 nm.

The polarizing direction of pumping radiation 26 emitted from the semiconductor laser 20 is consistent with the upper vertical direction 30 of an optical axis 29. When the pumping radiation 26 is focused by the lens systems 21a and 21b, passes through the small spherical portion 23c, and enters the lasant material 23 with a beam walk-off angle, a population inversion is formed in the lasant material 23, and a laser oscillation of 1064 nm in wavelength is initiated in the case of a crystal of Nd:YVO$_4$. By passing a laser beam through the non-linear optical element 24, an output beam 27 converted to a second harmonic of 523 nm in wavelength is obtained.

The Nd:YVO$_4$ crystal providing the lasant material 23 is a positive uniaxial crystal with a c-axis, which is an oscillation facilitating axis, located in a plane including an optical axis 28 and the upper vertical direction 30 thereof, and inclined at an angle $\Psi=30°$ against the upper vertical direction 30 of the optical axis 28, and an a-axis inclined at an angle $\Psi$ against the optical axis 28. Therefore, as shown in FIG. 12(a), a beam walk-off is caused at an angle of 4.7° for an extraordinary ray having a polarizing component present in a plane including the optical axis 28 and the c-axis, and perpendicular to the optical axis 28, and a spacing between the optical axes 28 and 29 comes to be 83 μm for a length of 1.0 mm of the lasant material 23. In such manner, an optical axis of the optical resonator 25 is formed along the optical axis 29a in the lasant material 23 and the optical axis 28 in the non-linear optical element 24. On the other hand, a resonance loss of light advancing along an optical axis 29b in the lasant material 23 is increased.

Figure 13A:
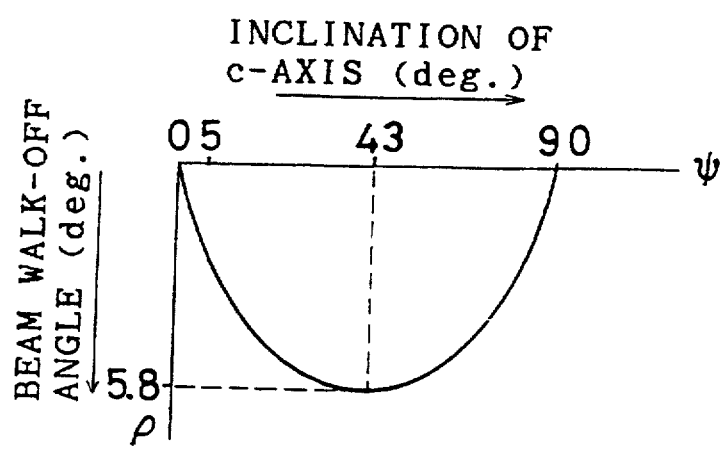
FIGS. 13(a) and (b) are graphs showing changes of a beam walk-off angle ρ and laser gain G of a lasant material 23 in relation to an inclination Ψ of c-axis.
Figure 13B:
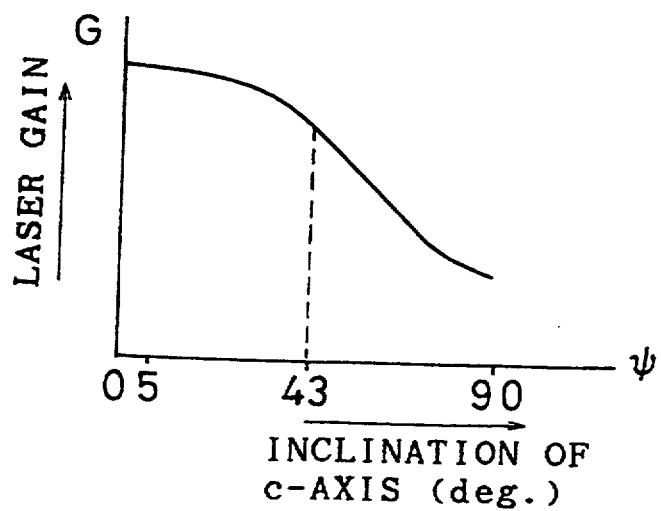

FIGS. 13(a) and (b) are graphs showing changes of a beam walk-off angle ρ and a laser gain G of the lasant material 23 to an inclination $\Psi$ of the c-axis. In the case the c-axis that is the oscillation facilitating axis of the lasant material 23 is perpendicular to the optical axis 28 ($\Psi=0°$), the laser gain G is at the maximum, and the beam walk-off angle ρ is at 0°. With the inclination of c-axis at $\Psi=43°$, the beam walk-off angle ρ comes to be the highest at 5.8°, while the laser gain G at that time is reduced approximately to a half of the maximum. Therefore, the inclination $\Psi$ of c-axis is preferably set within such range that longitudinal modes are properly discriminated, and reduction of the laser loss is less, that is, in a range of $5° \leq \Psi \leq 43°$.

Additionally, since Nd:YVO$_4$ providing the lasant material 23 has a few times higher gain to a polarization in the upper vertical direction 30 that is a component of extraordinary ray than to a polarization in the direction of a-axis a that is a component of ordinary ray, the laser oscillation is effected only on an optical axis of extraordinary ray.

On the other hand, a KTiOPO$_4$ crystal providing the non-linear optical element 24 is a positive biaxial crystal, and cut in parallel with a z-y' plane inclined at an angle $\theta=90°$ to z-axis and an angle $\theta=21.3°$ to y-axis in an index ellipsoid in a manner similar to that of prior aft. Therefore, polarizing axes thereof are z- and y'-axes, x'-axis perpendicular to the z- and y-axes is consistent with the optical axis 29, and the y'-axis is positioned at an inclination of $\alpha=45°$ to the Upper vertical direction 30 of the optical axis 29.

Furthermore, since a beam walk-off of 0.26° is caused in a x'-y' plane in the non-linear optical element 24, the surface 24b forming the optical resonator is in a flat plane.

Here, when a length of the lasant material 23 is set at 1.0 mm, and that of the non-linear optical element 24 at 5 mm, respectively, a longitudinal mode interval of the optical resonator 25 comes to be 0.51 Å. On the other hand, a phase difference δ due to retardation in the non-linear optical element 24 is an angle of $2\pi$ with a difference of wavelength of 26 Å at a wavelength of 1064 nm, that is, one cycle.

Figure 12B:
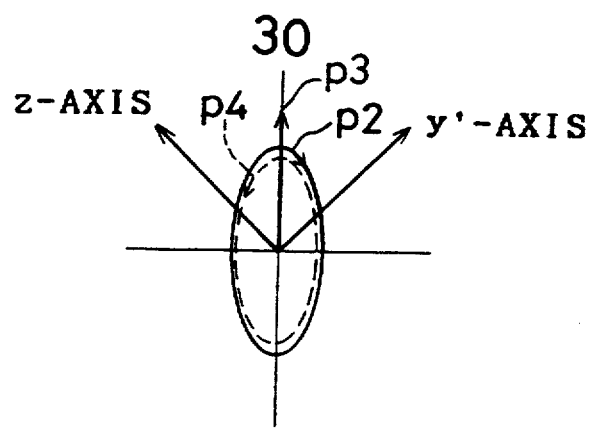

FIG. 12(b) shows a polarizing mode on the surface 24a of non-linear optical element 24. Polarizing modes of p2 to p4, for example, are caused on the surface 24a of non-linear optical element 24 in correspondence with plural longitudinal modes generated in the optical resonator 25. Here, a polarizing mode p3 is a linear polarization parallel with the upper vertical direction 30 of optical axis 29, because temperature of the non-linear optical element 24 is controlled by using a Peltier element in such manner that the phase difference $\delta$ due to one-way retardation in the non-linear optical element 24 comes to be $m\pi$ (where m is an integer). A retardation $\delta$ in an adjacent longitudinal mode can be calculated as $360°\times\pm0.51$ Å/26 Å = $\pm7.1°$ on the basis of the longitudinal mode p3. Thus, a resonance loss Loss of adjacent longitudinal modes with elliptic polarization modes p2, p4 is calculated as follows by using formula (1):

$$\text{Loss}=\sin^2\delta=(\sin\pm7.1°)^2=(\pm0.124)^2=0.015$$

and a loss of approximately 1.5% is caused. In such manner, by making use of a difference between polarizations, the longitudinal modes can be discriminated.

(Second Embodiment)

Figure 14A:
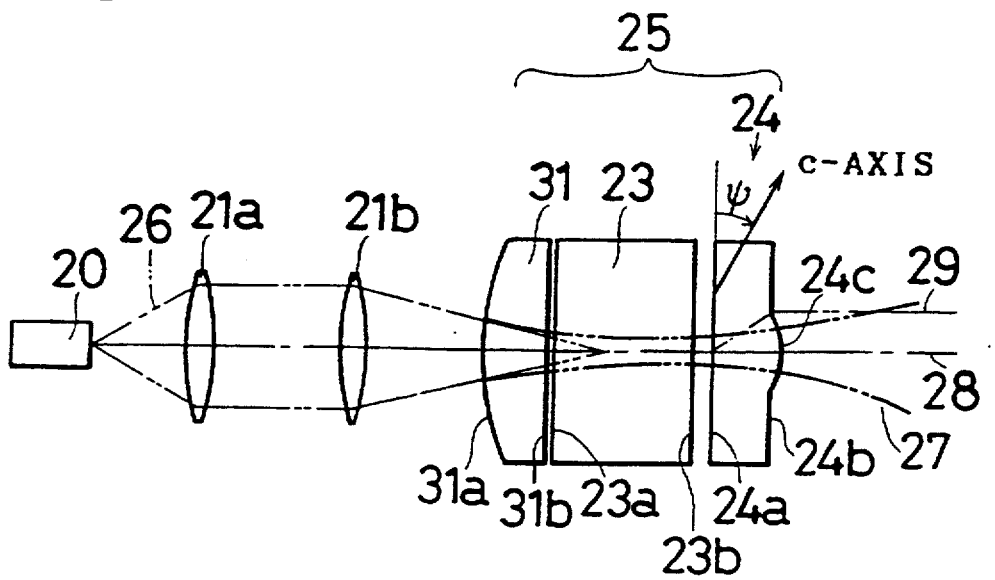
FIG. 14(a) is a front view showing a structure of a solid state laser apparatus of a second embodiment according to the invention, FIG. 14(b) a partial perspective view showing a position of polarizing axis of a non-linear optical element 24 thereof, and FIG. 14(c) a graph showing a polarizing mode on a surface 24a of the non-linear optical element 24.

FIG. 14(a) is a front view showing a structure of a solid state laser apparatus of a second embodiment according to the invention, and the solid state laser apparatus comprises such components as a semiconductor laser (SDL-8031-101, single stripe type, supplied by Tottori Sanyo Electric Co., Ltd.) 20 emitting a pumping radiation 26 for exciting of a lasant material 23, lens systems 21a (F-L40B supplied by New Port) and 21b (F-L 20 supplied by New Port) for focusing the pumping radiation 26 and an optical resonator 25 comprising a convex mirror 31, the lasant material 23 formed of Nd:YVO4 doped with approxiimately 1% of Nd and a non-linear optical element 24 formed of KNbO3, wherein a flat surface 31b of the convex mirror 31 is in contact with a surface 23a of the lasant material 23, and a spacing of 0.5 mm is provided between a surface 23b of the lasant material 23 and a surface 24a of the non-linear optical element 24. The convex mirror 31 is formed of an artificial quartz with a plano-convex shape, a radius of curvature of a spherical surface 31a at 9.2 mm and a thickness at 1.7 mm. Further, approximately in a center of surface 24b of the non-linear optical element 24, a small spherical portion 24c is formed by means of a fine processing technology utilizing the photolithography, and an aperture thereof is 72 $\mu$m in radius and 17 mm in radius of curvature.

The spherical surface 31a on the incident side of the pumping radiation 26 of the convex mirror 31 is coated with a coating having a transmissivity of 95% or more at wavelength of 809 nm of the pumping radiation 26 and a reflectance of 99.9% or more at a oscillating wavelength of the lasant material 23. The flat surface 31b of convex mirror 31 and the surface 23a of lasant material 23 is coated with a coating having a transmissivity of 99.9% or more at a wavelength of 1064 nm and a transmissivity of 95% or more at a wavelength of 809 nm. In addition, the surface 23b of the lasant material 23 is coated with a coating having a transmissivity of 99.9% or more at a wavelength of 1064 nm. The surface 24a of the non-linear optical element 24 is coated with a coating having a transmissivity of 99.9% or more at a wavelength of 1064 nm, and the surface 24b opposite is coated with a coating having a reflectance of 99.9% or more at a wavelength of 1064 nm and a transmissivity of 95% or more at a wavelength of 532 nm.

When the pumping radiation 26 emitted from the semiconductor laser 20 is focused by the lens systems 21a and 21b, passes through the convex mirror 31, and enters the lasant material 23, an populatin inversion is formed in the lasant material 23, and a laser oscillation of 1064 nm in wavelength is initiated, in the case of Nd:YVO4 crystal. Here, the polarizing direction of pumping radiation 26 is consistent with the direction of c-axis of the lasant material 23. As a laser beam passes through the non-linear optical element 24, an output beam 27 converted to a second harmonic of a wavelength of 532 nm is obtained on the basis of phase matching of type I.

Figure 14B:
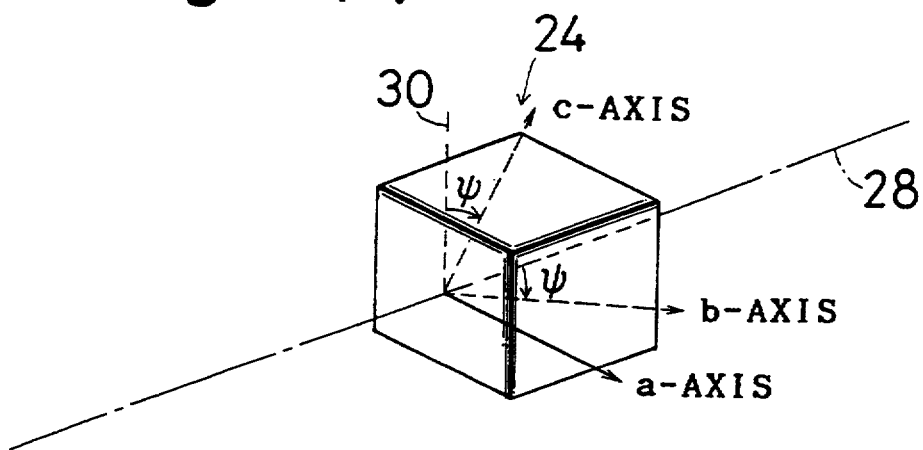

FIG. 14(b) is a partial perspective view showing a position of polarizing axis of the non-linear optical element 24 shown in FIG. 14(a). A KNbO3 crystal providing the non-linear optical element 24 is a biaxial crystal, and is cut such that an angle formed of the c-axis and a wave front of the optical resonator's mode on the optical axis 28 is 71.8°, that is, at an angle $\Psi=18.2°$ to an upper vertical direction 30 of the optical axis 28. Therefore, b-axis is also inclined at an angle $\Psi=18.2°$ to the optical axis 28 within a plane including the optical axis 28 and c-axis, and a-axis is perpendicular to the b-axis, c-axis and optical axis 28. In such case, a beam walk-off of 2.2° is caused in the non-linear optical element 24, and a spacing between the optical axes 28 and 29 comes to be 79 $\mu$m for 2.0 mm of material length of the non-linear optical element 24.

Here, when lengths of the lasant material 23 and non-linear optical element 24 are set at 3.4 mm, 2.0 mm, respectively, an interval of longitudinal modes of the optical resonator 25 comes to be 0.37 Å. On the other hand, a phase difference $\delta$ due to retardation in the lasant material 23 is at an angle of $2\pi$, when a difference of wavelength is 16Å at a wavelength of 1064 nm, that is, one cycle.

Figure 14C:
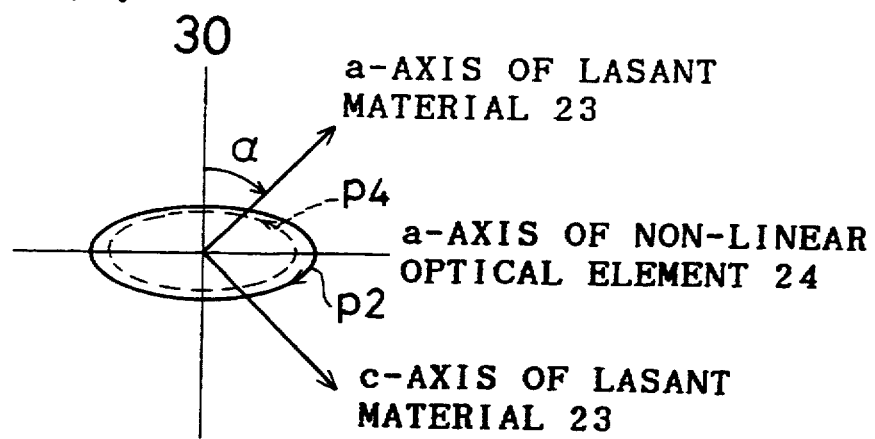

In FIG. 14(c), a polarizing mode on the surface 24a of non-linear optical element 24 is shown. The Nd:YVO4 providing the lasant material 23 is a positive uniaxial crystal, and is arranged such that a- and c-axes are perpendicular to the optical axis 28, and the a-axis is at an angle of 45° to the a-axis of non-linear optical element 24, that is, at an angle $\alpha=45°$ to the upper vertical direction 30 of the optical axis 28. In correspondence with plural longitudinal modes generated in the optical resonator 25, polarizing modes p2 to p4, for example, are caused on the surface 24a of non-linear optical element 24. Here, because a temperature of the lasant material 23 is controlled by using a Peltier element so that the phase difference $\delta$ due to one-way retardation thereof comes to be $m\pi$ (where m is an integer), a longitudinal mode p3 comes to be a linear polarization parallel with the a axis of non-linear optical element 24. Based on the longitudinal mode p3, a retardation $\delta$ of an adjacent longitudinal mode can be calculated as $360°\times\pm0.37$ Å/16 Å = $\pm8.3°$. Therefore, a resonance loss Loss of adjacent longitudinal modes with elliptic polarization modes p2 and p4 is calculated as shown below by using formula (1):

$$\text{Loss}=\sin^2\delta=(\sin\pm8.3°)^2=(\pm0.144)^2=0.021$$

and a loss of approximately 2.1% is caused. In such manner, the longitudinal modes can be discriminated by making use of a difference in polarization.

(Third Embodiment)

Figure 15A:
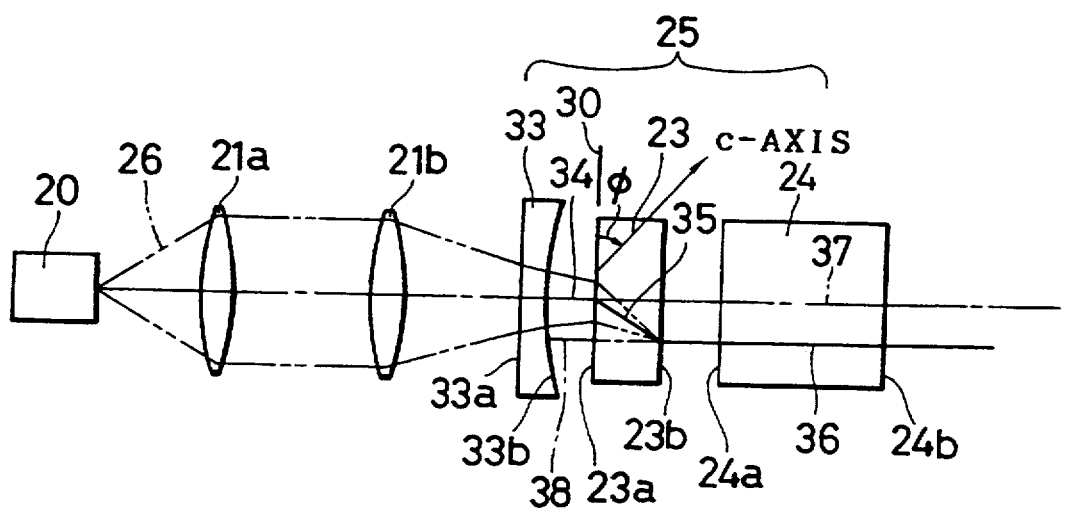
FIG. 15(a) is a front view showing a structure of a solid state laser apparatus of a third embodiment according to the invention, and FIG. 15(b) a view showing an arrangement of polarizing axis of a non-linear optical element 24.

FIG. 15(a) is a front view showing a structure of a solid state laser apparatus of a third embodiment according to the invention. The solid state laser apparatus comprises a semiconductor laser (SLD 303WT-25 supplied by SONY) emitting a pumping radiation 26 for exciting of a lasant material 23, lens systems 21a (F-L20 supplied by New Port) and 21b (F-L10B supplied by New Port) for focusing the pumping radiation 26, a concave reflecting mirror 33, an optical resonator 25 comprising the lasant material 23 formed of Nd:YVO$_4$ of 0.5 mm in thickness doped with 2 at % of Nd at and a non-linear optical element 24 formed of KTiOPO$_4$ of 3.4 mm in thickness. A spacing of 0.7 mm is provided between a surface 33b of the concave reflecting mirror 33 and a surface 23a of the lasant material 23, and another spacing of 1.9 mm between a surface 23b of the lasant material 23 and a surface 24a of the non-linear optical element 24. A radius of curvature of a surface 33b of the concave reflecting mirror 33 is 5.2 mm. In the case of such arrangement, a radius $\omega$ of transverse mode in electric field of laser mode within the lasant material 23 is approximately 66 $\mu$m (calculated value).

A surface 33a of the concave reflecting mirror 33 is coated with a coating having a transmissivity of 99.8% or more in at a wavelength of 809 nm of the pumping radiation 26. The surface 33b of the concave reflecting mirror 33 is coated with a coating having a transmissivity of 95% or more at a wavelength of 809 nm and a reflectance of 99.8% or more at an oscillating wavelength of 1064 nm of the lasant material 23. The surface 23a of the lasant material 23 is coated with a coating having a transmissivity of 95% or more at a wavelength of 809 nm and a transmissivity of 99.8% or more at the oscillating wavelength of 1064 nm of the lasant material 23. In addition, the surface 23b of lasant material 23 and a surface 24a of the non-linear optical element 24 are coated with a coating having a transmissivity of 99.8% or more at a wavelength of 1064 nm. A surface 24b of the non-linear optical element 24 is coated with a coating having a reflectance of 99.8% or more at a wavelength of 1064 nm and a transmissivity of 95% or more at a wavelength of 532 nm of a second harmonic.

The polarizing direction of pumping radiation 26 emitted from the semiconductor laser 20 is consistent with the upper vertical direction 30 of an optical axis 34. A c-axis of Nd:YVO$_4$ crystal providing the lasant material 23 falls in a plane including the optical axis 34 and the upper vertical direction 30, and is inclined at an angle $\Psi = 40°$ to the upper vertical direction 30. Then, a beam walk-off of an angle of 5.8° is caused along an optical axis 35 of extraordinary ray, and a spacing between the optical axes 34 and 38 and that between optical axes 36 and 37 are 51 $\mu$m, respectively. Since Nd:YVO$_4$ forming the lasant material 23 provides a few times higher gain to a polarization in the upper vertical direction 30 that is a component of extraordinary ray than to a polarization in the direction of a-axis, a laser oscillation is caused on an optical axis of extraordinary ray.

Figure 15B:
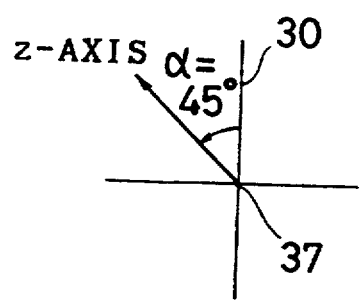

On the other hand, KTiOPO$_4$ providing the non-linear optical element 24 is cut at such an angle that a wavelength of 1064 nm of a fundamental wave is converted to a wavelength of 532 of a second harmonic, and z-axis thereof is positioned, as shown in FIG. 15(b), so as to be crossed at an angle $\alpha = 45°$ to the upper vertical direction 30, when viewed in the direction of optical axis 37. A phase difference due to one-way retardation of the KTiOPO$_4$ unit is 2 m$\pi$ (where m is an integer) with respect to a wave length of 1064.08 nm at a temperature of 26.9° C. In such manner, an optical axis for laser oscillation is formed in the optical resonator 25 along the optical axis 34, the optical axis 35 of lasant material 23 and the optical axis 36 of non-linear optical element 24.

Figure 16:
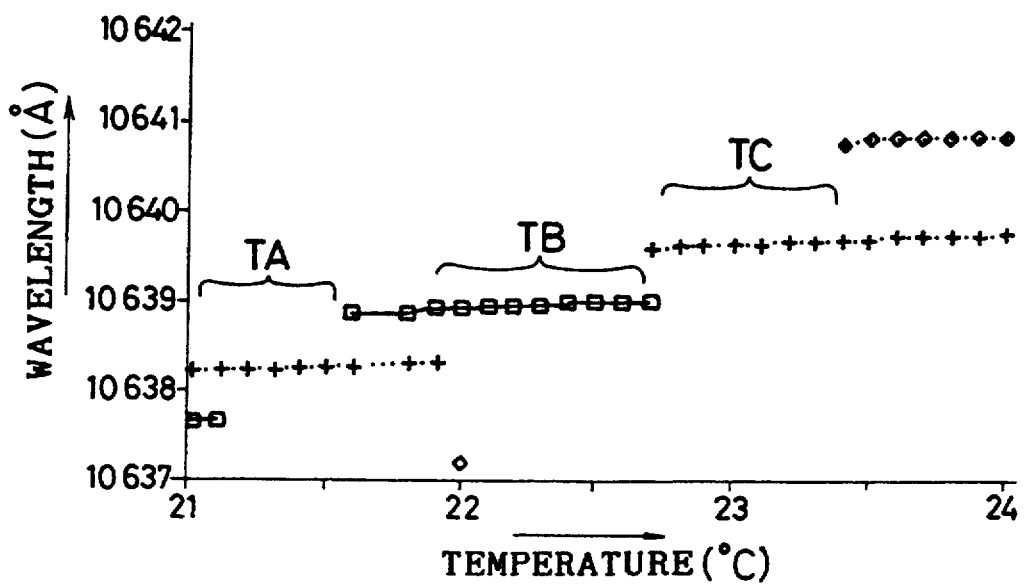
FIG. 16 is a graph showing a KTP temperature dependency of wavelength in laser oscillation in a solid state laser apparatus of the third embodiment according to the invention.
Figure 17:
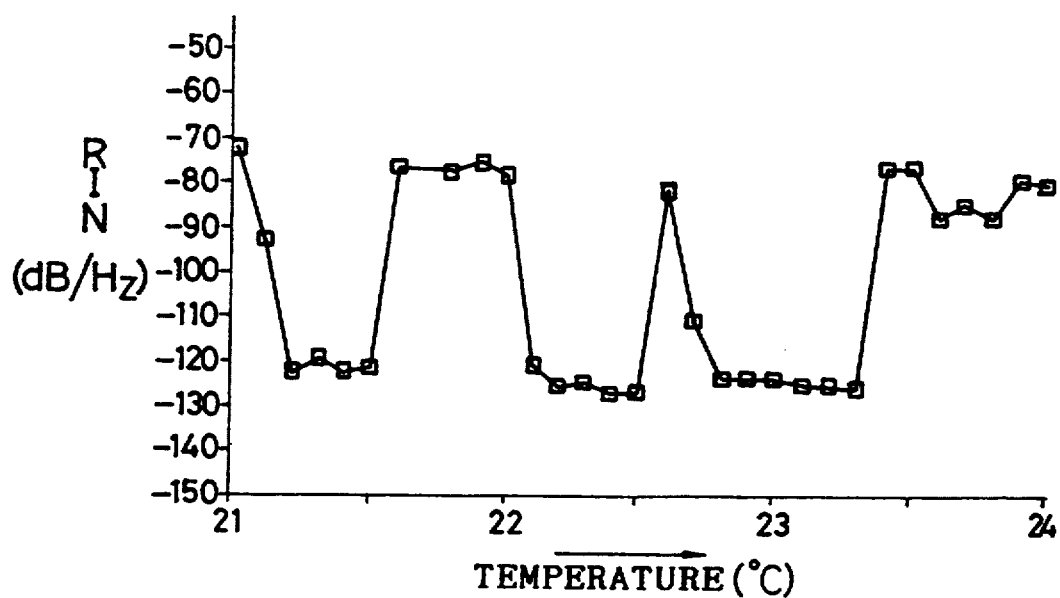
FIG. 17 is a graph showing a KTP temperature dependency of RIN in a solid state laser apparatus of the third embodiment according to the invention.

Here, by controlling a temperature of KTiOPO$_4$ forming the non-linear optical element 24 within a range of 21° C. to 24° C. by means of a Peltier element, and thus controlling a phase difference due to retardation (during laser oscillation, the temperature is considered to be locally increased by a few degrees due to a high power density in a frequency band of 1064 nm of the KTiOPO$_4$), changes of laser oscillating wavelength, that is, changes of longitudinal modes about a wavelength of 1064 nm and a relative intensity noise (RIN) at 1 MHz of an output beam of 532 nm in wavelength were measured. FIG. 16 is a graph showing a KTP temperature dependency of laser oscillating wavelength, and FIG. 17 a graph showing a KTP temperature dependency of RIN. In FIG. 16, as a result of measuring polarization of exit beam on both sides of concave reflecting mirror 33 and non-linear optical element 24 in temperature ranges TA(21.2° C.–21.6° C.), TB(21.9° C.–22.7° C.) and TC(22.8° C.–23.4° C.) where laser oscillation is of a single longitudinal mode, it was found that polarization of laser oscillation either inside the lasant material 23 and on the surface 24b of non-linear optical element 24 is substantially a linear polarization parallel with the upper vertical direction 30. The fact, together with a fact that an oscillating wavelength is shifted to long wavelength side as the temperature is increased, shows that longitudinal modes of laser oscillating wavelength are discriminated and controlled in such manner that a phase difference due to one-way retardation of KTiOPO$_4$ comes to be substantially 2 m$\pi$. Moreover, in FIG. 17, no spike-type output instability is found in a laser output of a wavelength of 532 nm, and the relative intensity noise RIN is at $-120$ dB/Hz or less in the temperature ranges TA, TB and TC where the longitudinal modes were discriminated.

Thus, an output variation due to mode hopping can be reduced by discriminating two polarizing modes by means of a resonator loss, and realizing a single longitudinal mode by suppressing the other longitudinal modes.

(Fourth Embodiment)

Figure 18:
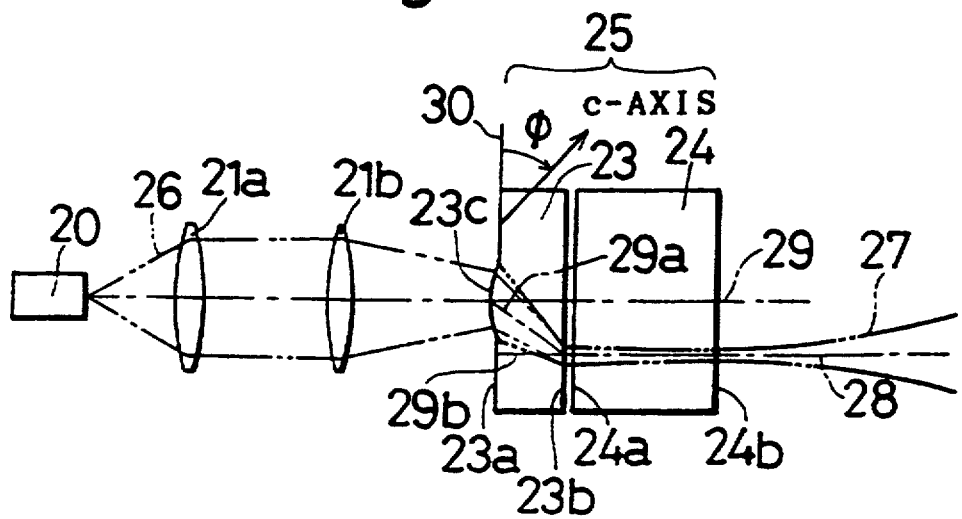
FIG. 18 is a front view showing a structure of a solid state laser apparatus of a fourth embodiment according to the invention.

FIG. 18 is a front view showing a structure of a solid state laser apparatus of a fourth embodiment according to the invention. The solid state laser apparatus comprises such components as a semiconductor laser (SLD 303WT-25 supplied by SONY) emitting a pumping radiation 26 for exciting a lasant material 23, lens systems 21a (F-L20 supplied by New Port) and 21b (F-L10B supplied by New Port) and an optical resonator 25 comprising the lasant material 23 formed of Nd:YVO$_4$ of 0.5 mm in thickness doped with 2 at % of Nd and, and a non-linear optical element 24 formed of KTiOPO$_4$ of 5 mm in thickness. Approximately in a center of surface 23a of the lasant material 23, a small spherical portion 23c is formed by means of a fine processing technology utilizing the photolithography, a radius of an aperture of the spherical portion is 100 μm, and a radius of curvature thereof 20 mm. A spacing of 2 mm is provided between a surface 23b of the lasant material 23 and a surface 24a of the non-linear optical element 24. In the case of such arrangement, a radius ω of transverse mode in an electric field of laser mode within the lasant material 23 is approximately 43 μm (calculated value).

A surface 23a including the small curved surface 23c of the lasant material 23 is coating with a coating having a transmissivity of 95% or more at a wavelength of 809 nm of the pumping radiation 26, a reflectance of 99.8% or more at an oscillating wavelength of 1064 nm of the lasant material 23 and a transmissivity of 95% or more at a wavelength of 532 nm of a second harmonic. In addition, the surface 23b of lasant material 23 and surface 24a of non-linear optical element 24 are coated with a coating having a transmissivity of 99.8% or more at a wavelength of 1064 nm and a transmissivity of 95% or more at a wavelength of 532 nm. A surface 24b of the non-linear optical element 24 is coated with a coating of having a reflectance of 99.8% or more at a wavelength of 1064 nm and a transmissivity of 95% or more at a wavelength of 532 nm.

The polarizing direction of pumping radiation 26 emitted from the semiconductor laser 20 is consistent with the upper vertical direction 30 of an optical axis 29. A c-axis of Nd:YVO$_4$ crystal providing the lasant material 23 falls in a plane including the optical axis 29 and the upper vertical direction 30 thereof, and is inclined at an angle $\phi=40°$ to the upper vertical direction 30. Then, a beam walk-off of an angle of 5.8° is caused along an optical axis 29a of extraordinary ray, a spacing between the optical axes 29 and 29b and that between optical axes 28 and 29 are 51 μm, respectively, which corresponds approximately to a half radius of the aperture in the small curved surface 23c. In addition, because Nd:YVO$_4$ forming the lasant material 23 provides a few times higher gain to a polarization in the upper vertical direction 30 that is a component of extraordinary ray than to a polarization in the direction of a-axis that is a component of ordinary ray, a laser oscillation is caused along an optical axis of extraordinary ray.

On the other hand, KTiOPO$_4$ providing the non-linear optical element 24 is cut at such an angle that a wavelength of 1064 nm of a fundamental wave is converted to a wavelength of 532 nm of a second harmonic, and z-axis thereof is positioned, in a similar manner as shown in FIG. 15(b), so as to be crossed at an angle $\alpha=45°$ to the upper vertical direction 30, when viewed in the direction of optical axis 37. Thus, an optical axis for laser oscillation is formed in the optical resonator 25 along the optical axis 29a of lasant material 23 and the optical axis 28 of non-linear optical element 24.

Figure 19:
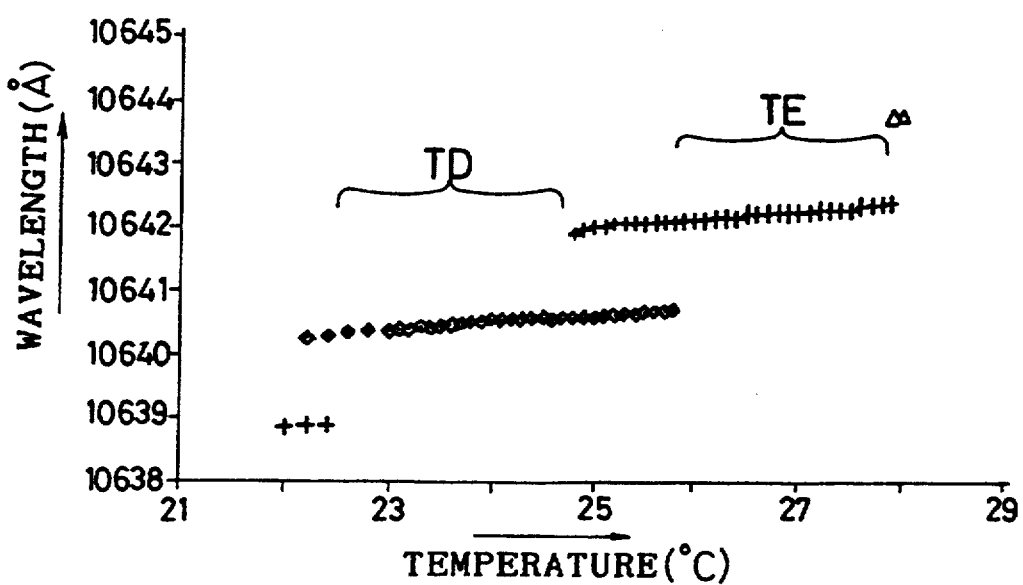
FIG. 19 is a graph showing a KTP temperature dependency of wavelength in laser oscillation in a solid state laser apparatus of the fourth embodiment according to the invention.
Figure 20:
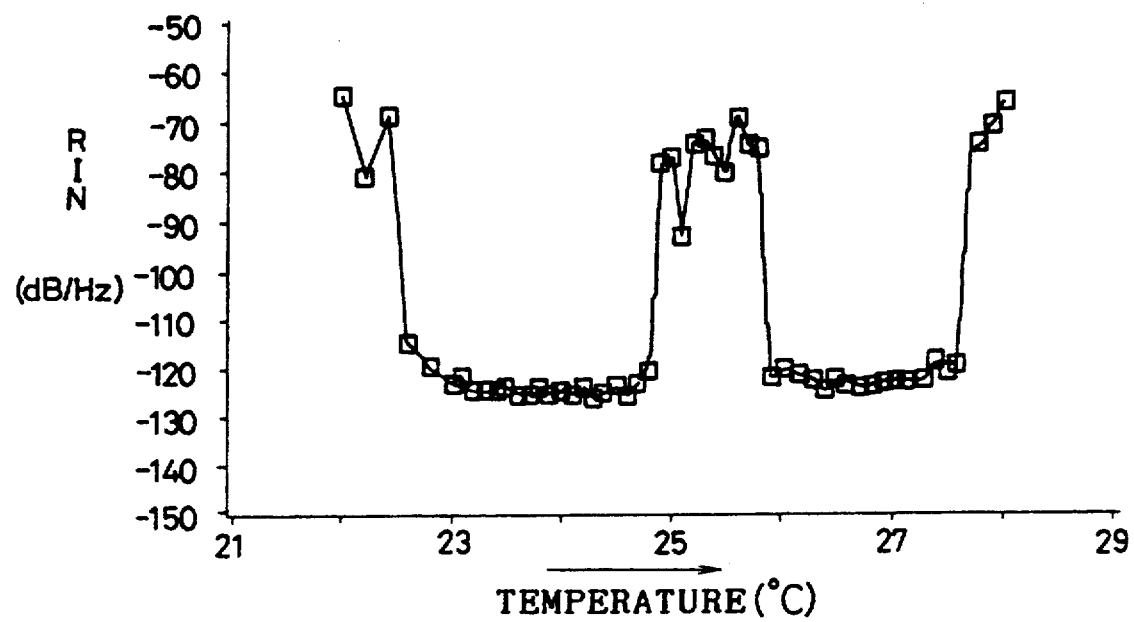
FIG. 20 is a graph showing a KTP temperature dependency of RIN in a solid state laser apparatus of the fourth embodiment according to the invention.

Here, by controlling a temperature of KTiOPO$_4$ forming the non-linear optical element 24 within a range of 22° C. to 28° C. by means of a Peltier element, and thus controlling a phase difference due to retardation (during laser oscillation, the temperature is considered to be locally increased by a few degrees because of a high power density in a frequency range of 1064 nm of KTiOPO$_4$), changes of laser oscillating wavelength, that is, changes of longitudinal modes about a wavelength of 1064 nm and a relative intensity noise (RIN) at 1 MHz of an output beam of 532 nm in wavelength were measured. FIG. 19 is a graph showing a KTP temperature dependency of laser oscillating wavelength, and FIG. 20 a graph showing a KTP temperature dependency of RIN. In FIG. 19, in temperature ranges TD(22.5° C.-24.8° C.) and TE(25.9° C.-27.8° C.) where laser oscillation is of a single longitudinal mode, it was found that a laser oscillation of a wavelength of 1064 nm provided a substantially linear polarization parallel with the upper vertical direction 30 within the lasant material 23 by measuring a polarization of exit beam of the small curved reflecting mirror 23c, and a polarization on the surface 24b of non-linear optical element 24 was substantially a linear polarization perpendicular to the upper vertical direction 30 by measuring a polarization of exit beam on the side of non-linear optical element 24. The fact, together with a fact that an oscillating wavelength is shifted to long wavelength side as the temperature is increased, shows that a polarization of laser oscillation inside the lasant material provides an extraordinary ray polarization, and longitudinal modes of laser oscillating wavelength are discriminated and controlled in such manner that a phase difference due to one-way retardation comes to be substantially $(2m+1)\pi$. Moreover, in FIG. 20, no spike-type output instability is found in a laser output of a wavelength of 532 nm, and the relative intensity noise RIN is at −120 dB/Hz or less in the temperature ranges TD and TE where the longitudinal modes were discriminated.

Thus, an output variation due to mode hopping can be reduced by distinguishing two polarizing modes by means of a resonator loss, and realizing a single longitudinal mode by suppressing the other longitudinal modes.

(Fifth Embodiment)

A solid state laser apparatus of a fifth embodiment according to the invention has a structure similar to that of the fourth embodiment shown in FIG. 18, and is different in that a c-axis of Nd:YVO$_4$ crystal providing a lasant material 23 falls in a plane including an optical axis 29 and the upper vertical direction 30 thereof, and is inclined at an angle $\phi=14°$ to the upper vertical direction 30. In such case, a beam walk-off of an angle of 2.9° is caused along an optical axis 29a of extraordinary ray, a spacing between the optical axes 29 and 29b and that between optical axes 28 and 29b are 25 μm, respectively, which corresponds to ¼ of an aperture radius of a small curved surface 23c in a reflecting mirror. In addition, a spacing of 1.5 mm is provided between a surface 23b of lasant material 23 and a surface 24a of non-linear optical element 24. The small curved surface is 100 μm in opening radius, and 20 mm in radius of curvature.

Figure 21:
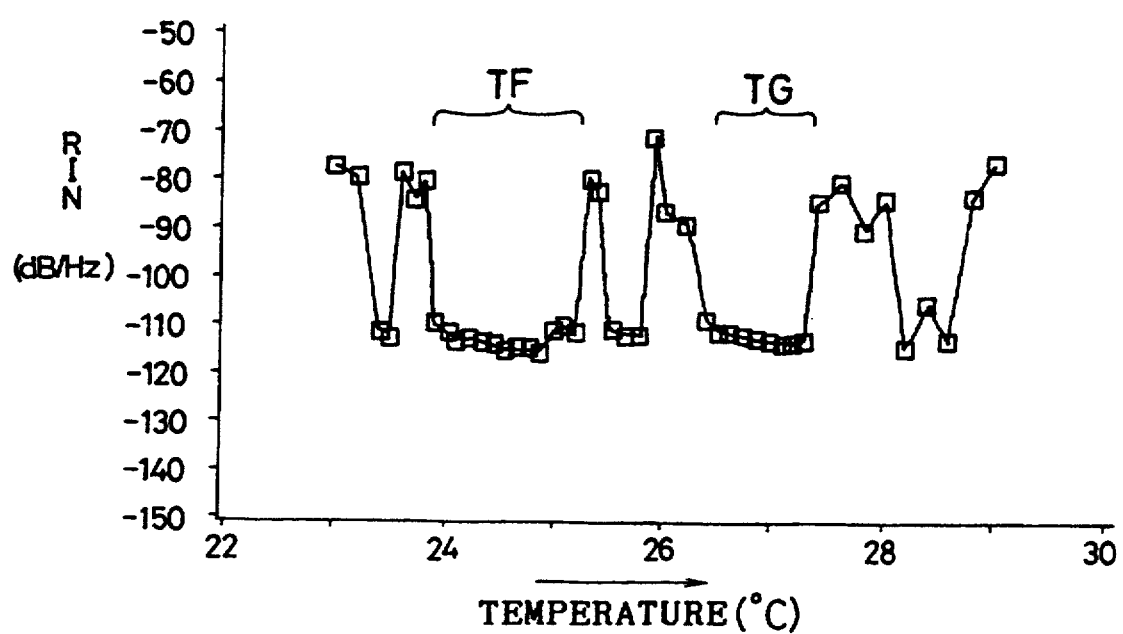
FIG. 21 is a graph showing a KTP temperature dependency of RIN in a solid state laser apparatus of a fifth embodiment according to the invention.

Here, by controlling a temperature of KTiOPO$_4$ forming the non-linear optical element 24 within a range of 22° C. to 28° C. by means of a Peltier element, and thus controlling a phase difference due to retardation (during laser oscillation, the temperature is considered to be locally increased by a few degrees due to a high power density in a frequency band of 1064 nm of KTP), a relative intensity noise (RIN) at 1 MHz of an output beam of 532 nm in wavelength were measured. FIG. 21 is a graph showing a KTP temperature dependency of RIN. In FIG. 21, it was found that oscillation in a single longitudinal mode was obtained, and a spike-type output instability was eliminated in temperature ranges TF(23.9° C.-25.2° C.) and TG(26.4° C.-27.3° C.) where the relative intensity noise is −110 dB/Hz or less. It was recognized that the laser oscillation of 1064 nm provided a substantially linear polarization in parallel with the upper vertical direction 30 within the lasant material 23 by measuring a polarization of exit beam in the side of small curved surface 23c of the reflecting mirror, and a polarization on the surface 24b of non-linear optical element 24 was a substantially linear polarization perpendicular to the upper vertical direction 30 by measuring a polarization of exit beam on the side of non-linear optical element 24. The fact, together with a fact that an oscillating wavelength is shifted to long wavelength side as the temperature is increased, shows that a polarization of laser oscillation inside the lasant material 23 is an extraordinary ray polarization, and longitudinal modes of laser oscillating wavelength are discriminated and controlled in such manner that a phase difference due to one-way retardation of KTiOPO$_4$ comes to be substantially $(2m+1)\pi$ (where m is an integer).

Thus, an output variation due to mode hopping can be reduced by discriminating two polarizing modes by means of a resonator loss, and realizing a single longitudinal mode by suppressing the other longitudinal modes.

(Sixth Embodiment)

Figure 22A:
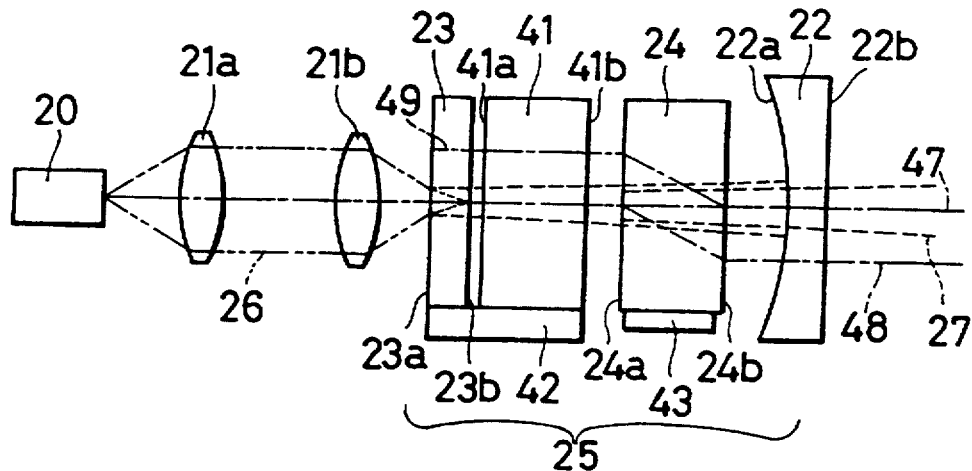
FIG. 22(a) is a front view showing a structure of a solid state laser apparatus of a sixth embodiment according to the invention, FIG. 22(b) a coordinate system showing the cutting direction of a non-linear optical element 24, FIG. 22(c) a partial perspective view showing the polarizing direction of pumping radiation 26 in FIG. 22(a) and an arrangement of a polarizing axis of a birefringent optical element 41 and the non-linear optical element 24, and FIG. 22(d) a graph showing a polarizing mode on a surface 24a of the non-linear optical element 24.

FIG. 22(a) is a front view showing a structure of a solid state laser apparatus of a sixth embodiment according to the invention. The solid state laser apparatus comprises such components as a semiconductor laser (SLD 332 V supplied by SONY) emitting a pumping radiation 26 for exciting a lasant material 23, lens systems 21a and 21b (F-LA40 supplied by New Port) and an optical resonator 25 comprising the lasant material 23 formed of Nd:Y$_3$Al$_5$O$_{12}$ doped with approximately 1.4 at % of Nd, a birefringent optical element 41 of KNbO$_3$, a non-linear optical element 24 of KNbO$_3$ and a concave mirror 22.

Temperature of the lasant material 23 is precisely controlled together with the birefringent optical element 41 by means of a Peltier element 42, while temperature of the non-linear optical element 24 is precisely controlled by a Peltier element 43.

A crystal length of the lasant material 23 is 1.5 mm, that of the birefringent optical element 41 is 2.5 mm, and that of the non-linear optical element 24 is 2.5 mm. A radius of curvature of a surface 22a of the concave mirror 22 is 7.8 mm. A surface 23b of the lasant material 23 is in contact with a surface 41a of the birefringent optical element 41, a spacing of 0.5 mm is provided between a surface 41b of the birefringent optical element 41 and a surface 24a of the non-linear optical element 24, and a spacing of 0.5 mm between a surface 24b of the non-linear optical element 24 and the surface 22a of concave mirror 22. The optical resonator 25 is formed for a laser oscillating wavelength of 946 nm by the surface 23a of lasant material 23 and the surface 22a of concave mirror 22.

A surface 23a of the lasant material 23 is coated with a coating having a transmissivity of 80% or more at a wavelength of 809 nm of the pumping radiation 26 and a reflectance of 99.9% or more at wavelength of 946 nm that is an oscillating wavelength of the lasant material 23. On the other hand, the surface 23b of the lasant material 23 is coated with a coating having a transmissivity of 99.9% or more at a wavelength of 946 nm. The surfaces 41a and 41b of the birefringent optical element 41 are coated with a coating having a transmissivity of 99.9% or more at a wavelength of 946 nm. The surfaces 24a and 24b of the non-linear optical element 24 are coated with a coating having a transmissivity of 95% or more at a wavelength of 946 nm and a transmissivity of 95% or more at a wavelength of 473 nm of a second harmonic. The surface 22a of the concave mirror 22 is coated with a coating having for a reflectance of 99.9% or more at a wavelength of 946 nm and a transmissivity of 95% or more at a wavelength of 473 nm of a second harmonic. A surface 22b of the concave mirror 22 is coated with coating having a transmissivity of 95% or more at a wavelength of 473 nm of a second harmonic.

A KNbO$_3$ crystal providing the birefringent optical element 41 is cut perpendicularly to a-axis a thereof, and polarizing axes of the birefringent optical element 41 are, then, provided by b- and c-axes.

Figure 22B:
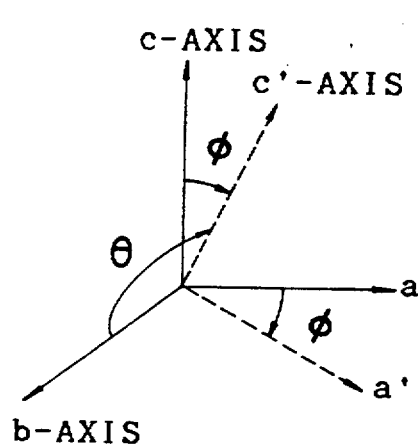

FIG. 22(b) is a coordinate system showing the cutting direction of KNbO$_3$ crystal providing the non-linear optical element 24. The non-linear optical element 24 is cut in parallel with a b-c' plane, when an axis c' is defined in such manner that c- and c'-axes c and c' are at an angle $\phi = 29.9°$, and b- and c'-axes at an angle $\theta = 90°$. In such case, polarizing axes of the non-linear optical element 24 are provided by the b- and c' axes, and an index of refraction to a polarization of a wavelength of 946 nm in the b-axis and an index of refraction to a polarization of a wavelength of 473 nm in the c'-axis are consistent with each other. Therefore, in the case that the direction of light propagation is perpendicular to the cut surface, a polarizing component in the b-axis of a laser beam of 946 nm in wavelength together with a second harmonic thereof (polarization in the c'-axis) can meet a condition of type I phase matching at a room temperature.

Figure 22D:
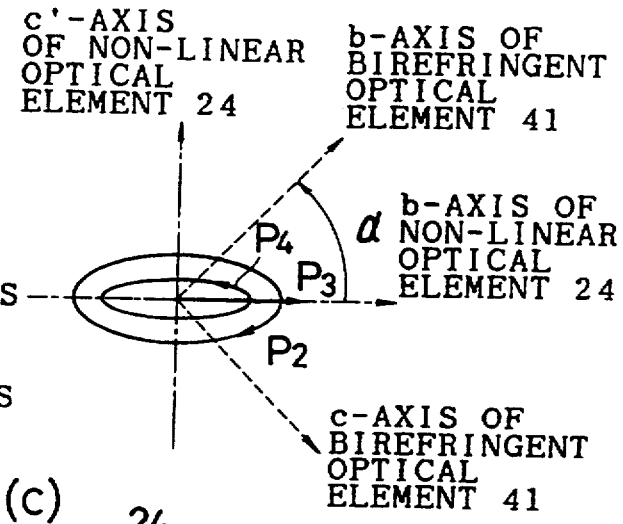
Figure 22C:
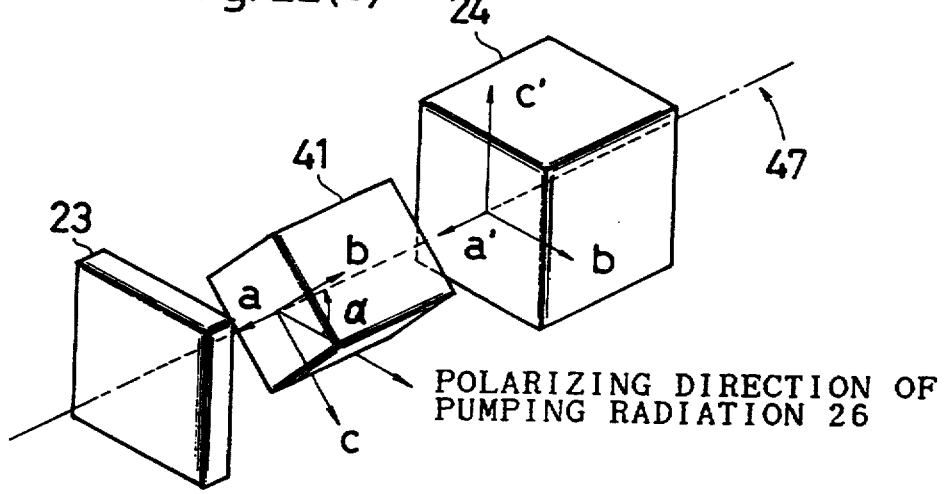
Figure 23A:
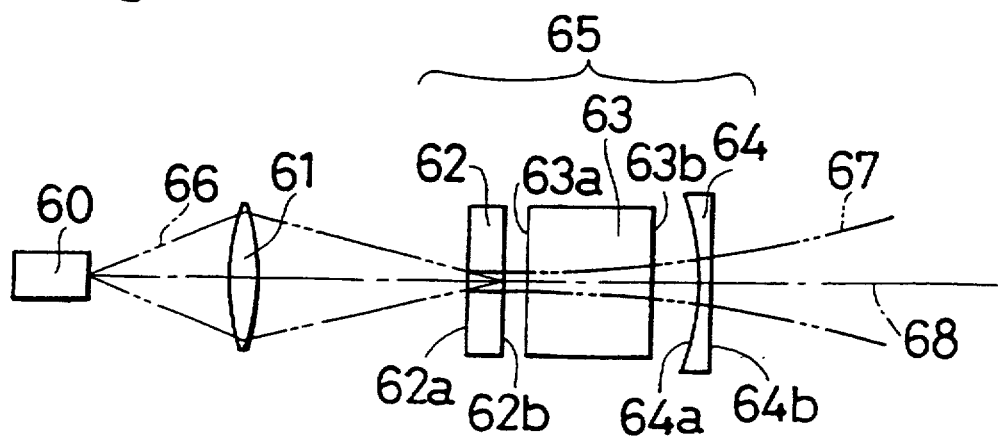
FIG. 23(a) is a front view showing an example of structure of a conventional solid state laser apparatus, FIG. 23(b) a partial perspective view showing an arrangement of a polarizing axis of a lasant material 62 and non-linear optical element 63, and FIG. 23(c) a coordinate system explaining the cutting direction of the non-linear optical element 63.
Figure 23B:
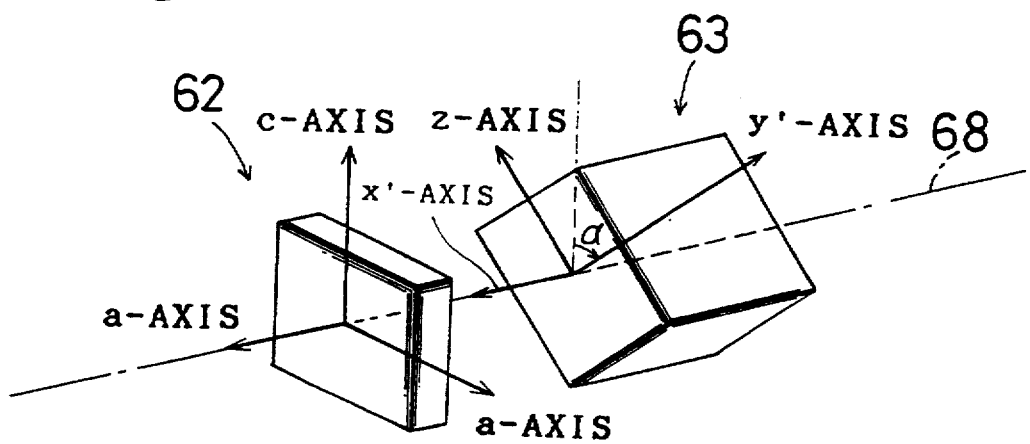
Figure 23C:
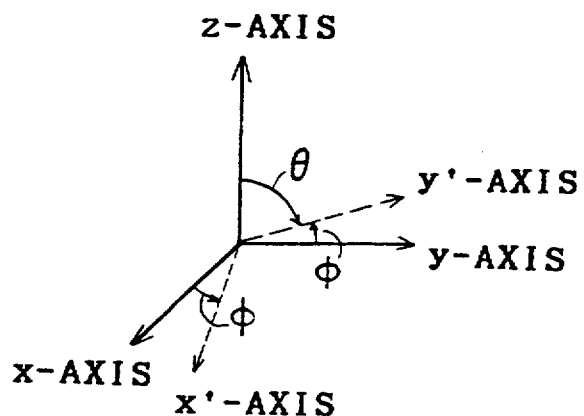

FIG. 22(c) is a partial perspective view showing the polarizing direction of pumping radiation 26 shown in FIG. 22(a) and an arrangement of polarizing axes of the birefringent optical element 41 and the non-linear optical element 24. An a-axis of the birefringent optical element 41 is consistent with an optical axis 47, and an angle $\alpha$ formed by a b-axis providing the polarizing axis and the polarizing direction of pumping radiation 26 is at 45°. On the other hand, an a'-axis of the non-linear optical element 24 is consistent with the optical axis 47, and a b-axis providing the polarizing axis is parallel with the polarizing direction of pumping radiation 26. In the case of such arrangement, a beam walk-off of 2.36° is caused inside the non-linear optical element 24 at a wavelength of 946 nm of fundamental wave. Because a crystal length of the non-linear optical element 24 is 2.5 mm, both spacings between the optical axis 47 and an optical axis 48 separated on the surface 24a of the non-linear optical element 24 and between the optical axis 47 and an optical axis 49 separated on the surface 24b of the non-linear optical element 24 are 103 µm, respectively.

The pumping radiation 26 emitted from the semiconductor laser 20 is focused by the lens systems 21a and 21b, and enters the lasant material 23 along the optical axis 47. As a result, a population inversion is formed in the lasant material 23, and an oscillation of fundamental wave of 946 nm in wavelength is caused along the optical axis 47, and stored in the optical resonator 25. A radius $\omega$ of transverse mode in an electric field of the fundamental wave is calculated as being 34 µm on the surface 23a of lasant material 23, and 49 µm on the surface 22a of concave mirror 22. While the radius $\omega$ of transverse mode in electric field of the fundamental wave on the surface 23a of lasant material 23 is 34 µm, and a radius of transverse mode of the pumping radiation 26 approximately 30 µm, because the optical axis 47 is spaced by a distance of 103 µm from the optical axis 49, a laser mode of fundamental wave along the optical axis 49 has merely a very low gain, and cannot be oscillated.

As an oscillation of fundamental wave of 946 nm in wavelength passes through the non-linear optical element 24, based on the type I phase matching, an output beam 27 converted to a wavelength of 473 nm of the second harmonic is obtained.

Because an optical length of the optical resonator 25 is 15.2 mm, an interval of longitudinal modes thereof is 0.30 Å. On the other hand, a phase difference $\delta$ due to oneway retardation in the birefringent optical element 41 comes to be at an angle of $2\pi$ when a difference in wavelength is 20.9 Å at a wavelength of 946 nm, that is, one cycle.

FIG. 22(d) is a graph showing a polarizing mode on the surface 24a of non-linear optical element 24. In correspondence with plural longitudinal modes generated in the optical resonator 25, polarizing modes p2 to p4, for example, are caused on the surface 24a of non-linear optical element 24. Here, temperature of the birefringent optical element 41 is controlled by a Peltier element 42 such that the phase difference $\delta$ due to oneway retardation at a wavelength of a longitudinal mode corresponding to the polarizing mode p3 is substantially $m\pi$ (where m is an integer). Therefore, the polarizing mode p3 provides a linear polarization parallel with the b-axis of non-linear optical element 24. On the other hand, the phase difference $\delta$ due to retardation in the adjacent polarizing modes p2 and p4 are calculated as:

$$\delta_{m\pi} \pm 360° \times 0.30 \text{ Å}/20.9 \text{ Å} = m\pi \pm 5.2°$$

Therefore, the elliptic polarizing modes p2 and p4 are subjected to a loss higher than p3 by a resonance loss Loss obtained by the formula (1). In this case, by using the formula (1), it is calculated as:

$$\text{Loss} = \sin^2\delta = (\sin \pm 5.2°)^2 = (\pm 0.091)^2 = 0.0082$$

and a loss of approximately 0.82% is caused. In such manner, by discriminating the longitudinal modes by making use of a difference in polarization, oscillation of a single longitudinal mode can be achieved. As a result, the mode hopping phenomena is suppressed, and a very stable output beam can be obtained.

As described above, as a birefringent optical element, such materials classified in (1) to (3) below, for example, can be employed in the invention. Materials classified below should be chosen according to particular specifications and purpose of a solid state laser apparatus for use as a birefringent optical element causing a beam walk-off for mode discrimination, and be preferably chosen in an appropriate combination.

(1) Simple birefringent materials

Such general birefringent materials as $SiO_2$ (rock crystal), $CaCO_3$ (calcite), $Al_2O_3$ (sapphire), $MgF_2$, $TiO_2$ (rutile), $BaTiO_3$, and such birefringent materials as so-called EO elements like $LiNbO_3$, for example, that are changed in index of refraction by application of an electric field.

(2) Lasant materials

Such materials as M:$YVO_4$, M:$LiYF_4$, M:$LaF_3$, M:$CaGdAlO_4$, M:$La_2O_2S$, M:$LaMgAl_{11}O_{19}$, M:$La_2Be_2O_5$, M:$YAlO_3$, $M_xLa_{1-x}P_5O_{14}$, $LiM_xGd_{1-x}P_4O_{12}$, $KM_xGd_{1-x}P_4O_{12}$, $M_xGd_{1-x}Al_3(BO_3)_4$, $M_xY_{1-x}Al_3(BO_3)_4$, $K_5Bi_{1-x}M_x(MoO_4)_4$ can be listed as representative materials. Here, M is such rare earth elements as Nd, Er, Ho, Tm and Yb, and two or more such elements may be employed in combination. Those including Cr and the like may be employed as well. Any other birefringent lasant material may be used such as those including Cr:$BeAl_2O_4$, Ti:$Al_2O_3$.

(3) Non-linear optical materials

Any birefringent non-linear optical material having an effect of second harmonic, third harmonic or higher harmonic conversion such as $KTiOPO_4$, $KNbO_3$, $LiNbO_3$, $\beta$-$BaB_2O_4$, $LiB_3O_5$, $Ba_2NaNb_5O_{15}$, $LiIO_3$, KDP, ADP.

The materials classified above should be employed as a birefringent optical element as intended in the invention for the following uses (A) and (B).

(A) For use as a birefringent optical element causing a beam walk-off for mode discrimination.

A spacing between two polarizing optical axes separated by a beam walk-off in a birefringent optical element depends on a degree of index anisotropy of a particular material, a beam walk-off angle $\rho$ determined by an angle of optical axis of an optical resonator to a principal axis of index ellipsoid and a length L of the material. (1) $CaCO_3$, (2) M:$YVO_4$ and (3) $KNbO_3$ in the classifications, for example, are those providing a higher beam walk-off angle. It is practically preferable that a birefringent optical material suitable for particular purpose and specifications (wavelength and other laser characteristics) of a solid state laser apparatus is chosen.

i) For obtaining a beam walk-off effect only

Use a material included in the classification (1) or (3) without a phase matching required for causing a harmonic, and cause a beam walk-off in the material.

ii) For simultaneous use as a lasant material as well

Cause a beam walk-off in lasant material included in the classification (2).

iii) For simultaneous use as a harmonic conversion element as well

Cut a material included in the classification (3) in the direction appropriate for harmonic generation.

However, since a beam walk-off is required, and an oscillation with an optical axis of optical resonator formed only for a polarizing optical axis in this case, in order to obtain an effective harmonic conversion, the material should be used only in so-called type I phase matching where a second harmonic linearly polarized in the direction perpendicular to a fundamental wave that is linearly polarized in one direction is generated.

(B) For use as a birefringent optical element other than (A)

Generally, as a polarizing component is caused with respect to both polarizing axes within a birefringent optical element other than (A), it is desirable that no beam walk-off is caused for use as such birefringent optical element, thus, a material should be desirably used such that an optical axis of optical resonator comes to be perpendicular to two principal axes of polarization. For the purpose of harmonic conversion, because of a phase matching, a beam walk-off is necessarily unavoidable.

As a difference in index of refraction between two polarizing axes is higher, and a material is longer, a discrimination effect of polarizing modes to a slight change in a wavelength of longitudinal mode of the resonator is increased. (1) $CaCO_3$, (2) $YVO_4$, (3) $KNbO_3$ in the classifications can be listed as examples of such materials. It is practically preferred that a birefringent optical material suitable for particular purpose and specifications of a solid state laser apparatus is chosen.

i) For birefringence only

Use a material included in the classification (I) or (3) without a phase matching required for harmonic conversion.

ii) For simultaneous use as a lasant material as well

Use a material included in the classification (2).

iii) For simultaneous use as a harmonic conversion element as well

Use a suitable material included in the classification (3) according to particular purpose and specifications of a solid state laser apparatus.

The invention is basically intended to provide means for suppressing the mode hopping, and reducing an output variation, and is not limited to such solid state laser apparatus for harmonic conversion in a resonator as described in prior art. It means that the invention provides for specifying a single longitudinal mode as well as stabilizing a frequency and narrowing a band in a conventional solid state laser apparatus.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A solid state laser apparatus comprising:
   an optical resonator including a plurality of optical elements, one of the optical elements being a lasant material excited by generated pumping radiation, at least two of the optical elements being birefringent optical elements, and an optical axis of the optical resonator being formed by a single one of two polarizing optical axes separated by a beam walk-off caused in a first one of the birefringent optical elements.

2. The solid state laser apparatus as claimed in claim 1, wherein the optical resonator is of a linear type, the optical resonator includes at least one reflecting mirror which is curved, and the first birefringent optical element is placed between the curved reflecting mirror and a second birefringent optical element.

3. The solid state laser apparatus as claimed in claim 2, wherein the optical resonator is of a linear type, the optical resonator further includes a second reflecting mirror which is flat and the second birefringent optical element is placed between the flat reflecting mirror and the first birefringent optical element.

4. The solid state laser apparatus as claimed in claim 3, wherein the lasant material is the first birefringent optical element.

5. The solid state laser apparatus as claimed in claim 4, wherein curved reflecting mirror of the optical resonator, the lasant material providing the first birefringent optical element, at least one of the second birefringent optical element and flat reflecting mirror of the optical resonator are placed in Sequential order starting from an incident side of the pumping radiation, and a beam walk-off is caused in the lasant material.

6. The solid state laser apparatus as claimed in claim 5, wherein the lasant material is formed of $Nd:YVO_4$.

7. The solid state laser apparatus as claimed in claim 6, wherein at least one of the second birefringent optical elements is formed of a non-linear optical material, and a laser beam oscillated by the lasant material is converted to a second harmonic by the non-linear optical material.

8. The solid state laser apparatus as claimed in claim 7, wherein the non-linear optical material is formed of $KTiOPO_4$.

9. The solid state laser apparatus as claimed in claim 3 wherein curved reflecting mirror of the optical resonator, the lasant material, the first birefringent optical element, the second birefringent optical element and the flat reflecting mirror of the optical resonator are placed in sequential order starting from an incident side of the pumping radiation, and a beam walk-off is caused also in the second birefringent optical element.

10. The solid state laser apparatus as claimed in claim 2, wherein the lasant material is the second birefringent optical element.

11. The solid state laser apparatus as claimed in claim 10, wherein the flat reflecting mirror of the optical resonator, the lasant material providing the second birefringent optical element, the first birefringent optical element and the curved reflecting mirror of the optical resonator are placed in sequential order starting from an incident side of the pumping radiation.

12. The solid state laser apparatus as claimed in claim 11, wherein the first birefringent optical element is formed of a non-linear optical material, and a laser beam oscillated by the lasant material is converted to a second harmonic by the non-linear optical material.

13. The solid state laser apparatus as claimed in claim 2, wherein the flat reflecting mirror of the optical resonator, the lasant material, the second birefringent optical element, the first birefringent optical element and the curved reflecting mirror of the optical resonator are placed in sequential order starting from an incident side of the pumping radiation.

14. The solid state laser apparatus as claimed in claim 13, wherein the lasant material is formed of Nd:YAG.

15. The solid state laser apparatus as claimed in claim 14, wherein the first birefringent optical element is formed of a non-linear optical material, and a laser beam oscillated by the lasant material is converted to a second harmonic by the non-linear optical material.

16. The solid state laser apparatus as claimed in claim 15, wherein the non-linear optical material is formed of $KNbO_3$.

17. An optical resonator, for use in a solid state laser apparatus including a device for generating a pumping radiation, the optical resonator comprising:
   a first optical element of a lasant material excited by received generated pumping radiation, the first optical element including a semi-spherical protrusion of limited aperture; and
   a second optical element, the second optical element being birefringent and an optical axis of the optical resonator being formed by a single one of two polarizing optical axes separated by a beam walk-off caused in the first optical element.

18. The optical resonator of claim 17, wherein the second birefringent optical element is of a non-linear optical material for converting a laser beam oscillated by the lasant material to a second harmonic.

19. The optical resonator of claim 18, wherein the non-linear optical material is formed of $KTiOPO_4$.

20. The optical resonator of claim 17, wherein the lasant material is formed of $Nd:YVO_4$.

21. An optical resonator, for use in a solid state laser apparatus including a device for generating a pumping radiation, the optical resonator comprising:
a curved mirror for receiving the generated pumping radiation;
a first birefringent element, adjacent the curved mirror, of a lasant material excited by the generated pumping radiation; and
a second birefringent element, proximate to the first birefringent element, including a semi-spherical protrusion of limited aperture, an optical axis of the optical resonator being formed by a single one of two polarizing optical axes separated by a beam walk-off caused in the second birefringent element.

22. The optical resonator of claim 21, wherein the second birefringent element is a non-linear optical element.

23. The optical resonator of claim 22, wherein the non-linear optical element is formed of $KNbO_3$.

24. The optical resonator of claim 22, wherein the non-linear optical element converts a laser beam oscillated by the lasant material to a second harmonic.

25. An optical resonator, for use in a solid state laser apparatus including a device for generating a pumping radiation, the optical resonator comprising:
a curved mirror for receiving the generated pumping radiation;
a first birefringent element, proximate to the curved mirror, of a lasant material excited by the generated pumping radiation; and
a second birefringent element, proximate to the first birefringent element, an optical axis of the optical resonator being formed by a single one of two polarizing optical axes separated by a beam walk-off caused in the first birefringent element.

26. The optical resonator of claim 25, wherein the second birefringent element is formed of a non-linear optical material for converting a laser beam oscillated by the lasant material to a second harmonic.

27. The optical resonator of claim 26, wherein the non-linear optical material is formed of $KTiOPO_4$.

28. The optical resonator of claim 25, wherein the lasant material is formed of $Nd:YVO_4$.

29. An optical resonator, for use in a solid state laser apparatus including a device for generating a pumping radiation, the optical resonator comprising:
a first optical element of a lasant material excited by received generated pumping radiation;
a second optical element being birefringent and proximate to the first optical element;
a third optical element being birefringent, formed of a non-linear optical material and proximate to the second optical element; and
a curved mirror proximate to the third optical element, said optical resonator having a single optical axis being formed by a single one of two polarizing optical axes separated by a beam walk-off caused in the third optical element.

30. The optical resonator of claim 29, wherein the second optical element is formed of $KNbO_3$.

31. The optical resonator of claim 29, wherein the third optical material is formed of $KNbO_3$.

32. The optical resonator of claim 29, further comprising:
a first Peltier element for controlling temperature of the first optical element and second optical elements; and
a second Peltier element for controlling temperature of the third optical element.

* * * * *